(12) United States Patent
Smith et al.

(10) Patent No.: US 11,356,476 B2
(45) Date of Patent: Jun. 7, 2022

(54) SYSTEM AND METHOD FOR SOCIAL NETWORK ANALYSIS

(71) Applicant: ZIGNAL LABS, INC., San Francisco, CA (US)

(72) Inventors: Alex Smith, Chadron, NE (US); Andras Benke, Bellevue, WA (US); Jonathan R Dodson, San Francisco, CA (US); Jeffrey Fenchel, San Francisco, CA (US); Loretta Jimenez, San Francisco, CA (US); Michael Kramer, San Francisco, CA (US); Fabien Vives, San Francisco, CA (US); Adam Beaugh, Kensington, CA (US); Felix Medina Wong, Fremont, CA (US); Melinda Chu, San Francisco, CA (US); Christopher Miller, San Francisco, CA (US)

(73) Assignee: ZIGNAL LABS, INC., San Francisco, CA (US)

(*) Notice: Subject to any disclaimer, the term of this patent is extended or adjusted under 35 U.S.C. 154(b) by 198 days.

(21) Appl. No.: 16/452,640

(22) Filed: Jun. 26, 2019

(65) Prior Publication Data
US 2019/0394231 A1    Dec. 26, 2019

Related U.S. Application Data

(60) Provisional application No. 62/689,889, filed on Jun. 26, 2018.

(51) Int. Cl.
*H04L 9/40* (2022.01)

(52) U.S. Cl.
CPC ...... *H04L 63/1466* (2013.01); *H04L 63/1416* (2013.01); *H04L 63/1425* (2013.01)

(58) Field of Classification Search
CPC ............. H04L 63/1466; H04L 63/1416; H04L 63/1425; H04L 2463/144; H04L 63/1458
(Continued)

(56) References Cited

U.S. PATENT DOCUMENTS 8,326,880 B2    12/2012  Carson, Jr.
8,464,346 B2     6/2013  Barai
(Continued)

FOREIGN PATENT DOCUMENTS

CN    101404658       4/2009
CN    101404658 B    11/2011
(Continued)

OTHER PUBLICATIONS

Office Action dated Oct. 29, 2020 for U.S. Appl. No. 16/580,098 (pp. 1-27).
(Continued)

*Primary Examiner* — Badri Narayanan Champakesan
(74) *Attorney, Agent, or Firm* — Graeser Associates International Inc.; Dvorah Graeser

(57) ABSTRACT

A system and method for detecting interactive network of automated accounts, the interactive network of automated accounts comprising a plurality of automated accounts posting to a social media channel, the system comprising: an ingestion engine operated by a computational device for connecting to the social media channel and receiving a plurality of social media postings from a plurality of posting entities; a bot model operated by a computational device for determining whether at least one posting entity is a suspected bot; and a computer network for communication between said computational devices.

16 Claims, 25 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 8,719,283 | B2* | 5/2014 | Koski | G06F 16/345 |
| | | | | 707/750 |
| 8,892,523 | B2* | 11/2014 | Amarendran | G06F 16/345 |
| | | | | 707/661 |
| 8,955,129 | B2* | 2/2015 | Cao | H04L 63/1483 |
| | | | | 726/23 |
| 9,037,464 | B1 | 5/2015 | Mikolov | |
| 9,043,417 | B1* | 5/2015 | Jones | H04L 51/12 |
| | | | | 709/206 |
| 9,077,744 | B2* | 7/2015 | Beutel | H04L 63/1441 |
| 9,191,411 | B2* | 11/2015 | Foster | H04L 63/20 |
| 9,213,997 | B2* | 12/2015 | Chatterjee | G06Q 10/107 |
| 9,659,185 | B2* | 5/2017 | Elovici | G06Q 50/01 |
| 9,762,596 | B2 | 9/2017 | Wang | |
| 9,852,111 | B2 | 12/2017 | Dasgupta | |
| 9,886,501 | B2* | 2/2018 | Krishnamurthy | G06F 16/3329 |
| 2008/0307526 | A1* | 12/2008 | Chung | H04L 63/1416 |
| | | | | 726/23 |
| 2011/0134137 | A1 | 6/2011 | Lee | |
| 2012/0101965 | A1 | 4/2012 | Hennig | |
| 2013/0124556 | A1 | 5/2013 | Chowdhury | |
| 2013/0151525 | A1 | 6/2013 | Ankan | |
| 2013/0232263 | A1 | 9/2013 | Kelly | |
| 2014/0317736 | A1* | 10/2014 | Cao | H04L 67/22 |
| | | | | 726/23 |
| 2014/0358930 | A1* | 12/2014 | Lerman | G06F 16/353 |
| | | | | 707/740 |
| 2015/0154305 | A1 | 6/2015 | Lightner | |
| 2015/0188941 | A1* | 7/2015 | Boshmaf | H04L 63/1441 |
| | | | | 726/22 |
| 2015/0264068 | A1* | 9/2015 | Beauchesne | H04L 63/1416 |
| | | | | 726/23 |
| 2015/0310862 | A1 | 10/2015 | Dauphin | |
| 2015/0324707 | A1 | 11/2015 | Zhou | |
| 2015/0339477 | A1* | 11/2015 | Abrams | G06F 21/554 |
| | | | | 726/23 |
| 2016/0019324 | A1 | 1/2016 | Kanderian | |
| 2016/0162538 | A1 | 6/2016 | Basson | |
| 2018/0005131 | A1* | 1/2018 | Yin | G06N 7/005 |
| 2018/0046475 | A1* | 2/2018 | Wei | G06F 16/90324 |
| 2018/0293607 | A1* | 10/2018 | Huddleston | G06Q 50/01 |
| 2018/0329985 | A1 | 11/2018 | Bao | |
| 2019/0014148 | A1* | 1/2019 | Foster | G06N 3/0445 |
| 2019/0332849 | A1* | 10/2019 | Gupta | G06N 3/084 |
| 2020/0012919 | A1 | 1/2020 | Bathaee | |

FOREIGN PATENT DOCUMENTS

| | | | | |
|---|---|---|---|---|
| KR | 101045331 B1 | 6/2011 | | |
| WO | WO-2017027320 A1 * | 2/2017 | ......... | H04L 63/1425 |

OTHER PUBLICATIONS

Kevin, WebGL Lesson One: Getting Started, posted on Jun. 26, 2011 on https://www.learnopengles.com/ webgl-lesson-one-getting-started/, accessed on Oct. 24, 2020, 12 pages. (Year: 2011).

https://medium.com/@gautam.karmakar/manhattan-lstm-model-for-text-similarity-2351f80d72f1 (published Mar. 31, 2018 by Gautam Karmakar, Medium.com), 7 pages.

Mikolov et al. ("Efficient Estimation of Word Representations in Vector Space"; Arxiv Sep. 7, 2013), 12 pages.

Mikolov et al. ("Distributed Representations of Words and Phrases and their Compositionality"; Arxiv Oct. 16, 2013), 9 pages.

S. Kullback and R. A. Leibler ("On Information and Sufficiency", Ann. Math. Statist., vol. 22, No. 1 (1951), 79-86).

Z. Wu and M. Palmer ("Verb Semantics and Lexical Selection", Arxiv, Jun. 24, 1994), 7 pages.

https://wordnet.princeton.edu/, by Fellbaum, Christiane (first published in 2005), 4 pages.

https://nlp.stanford.edu/projects/glove/, by Pennington et al, first published in Aug. 2014, 3 pages.

A. Conneau, D. Kiela, H. Schwenk, L. Barrault, A. Bordes, Supervised Learning of Universal Sentence Representations from Natural Language Inference Data, Proceedings of the 2017 Conference on Empirical Methods in Natural Language Processing; Sep. 2017, 11 pages.

http://pyvandenbussche.info/2017/translating-embeddings-transe, by Pierre-Yves Vandenbussche, published Aug. 29, 2017, 8 pages.

Cer et al ("Universal Sentence Encoder", https://static.googleusercontent.com/media/research.google.com/en//pubs/archive/46808.pdf, published Mar. 29, 2018), 7 pages.

Gupta et al., "Detection and Characterization of Anomalous Entities in Social Communication Networks", 20th International Conference on Pattern Recognition, ICPR 2010, Istanbul, Turkey, Aug. 23-26, 2010, 738-741.

Notice of Allowance dated Dec. 31, 2020 for U.S. Appl. No. 16/580,098 (pp. 1-5).

Notice of Allowance dated Mar. 17, 2021 for U.S. Appl. No. 16/580,098 (pp. 1-5).

Office Action (Non-Final Rejection) dated Oct. 21, 2021 for U.S. Appl. No. 17/224,224 (pp. 1-22).

Office Action dated Jun. 28, 2021 for U.S. Appl. No. 16/452,640 (pp. 1-20).

* cited by examiner

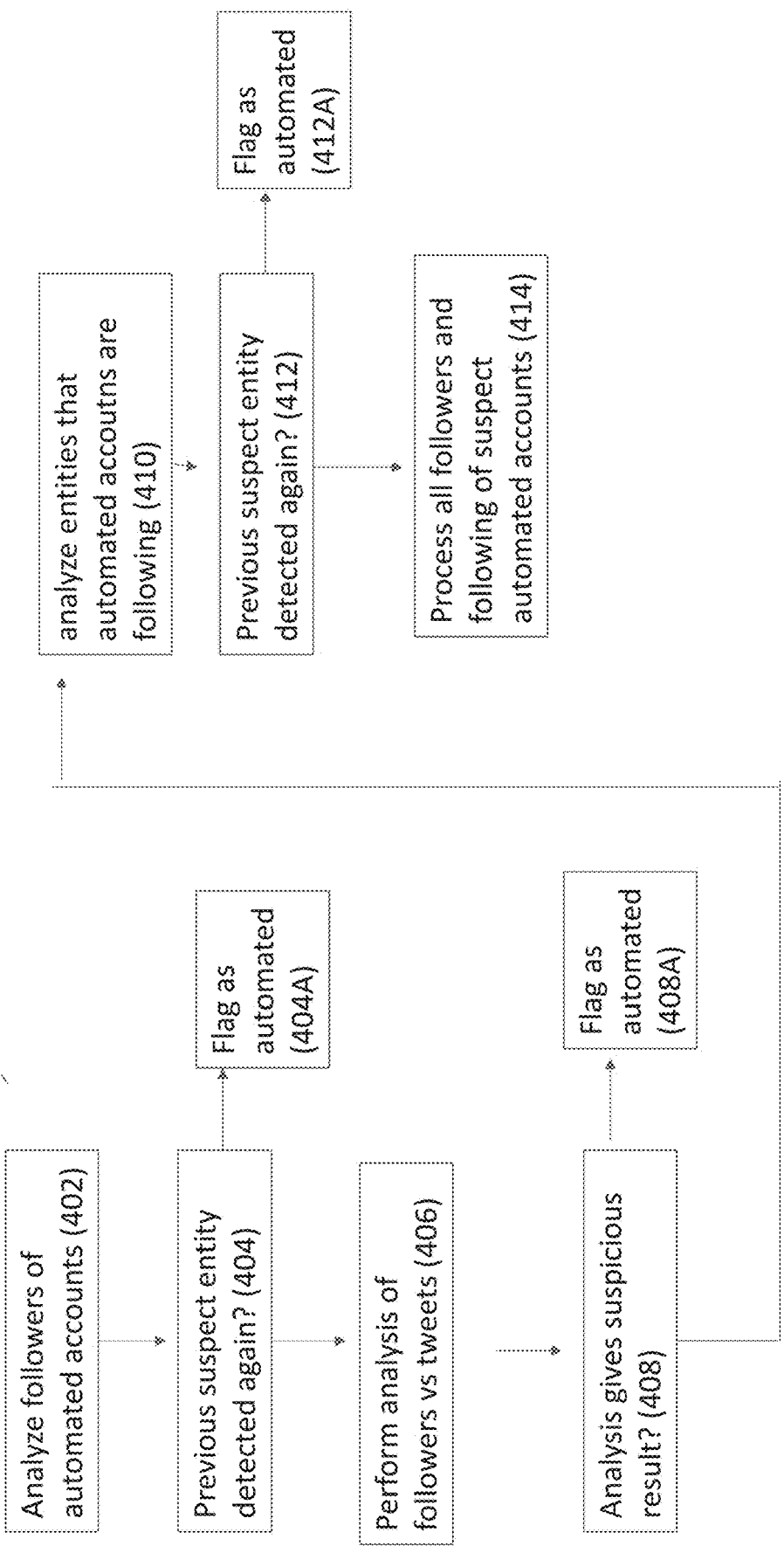

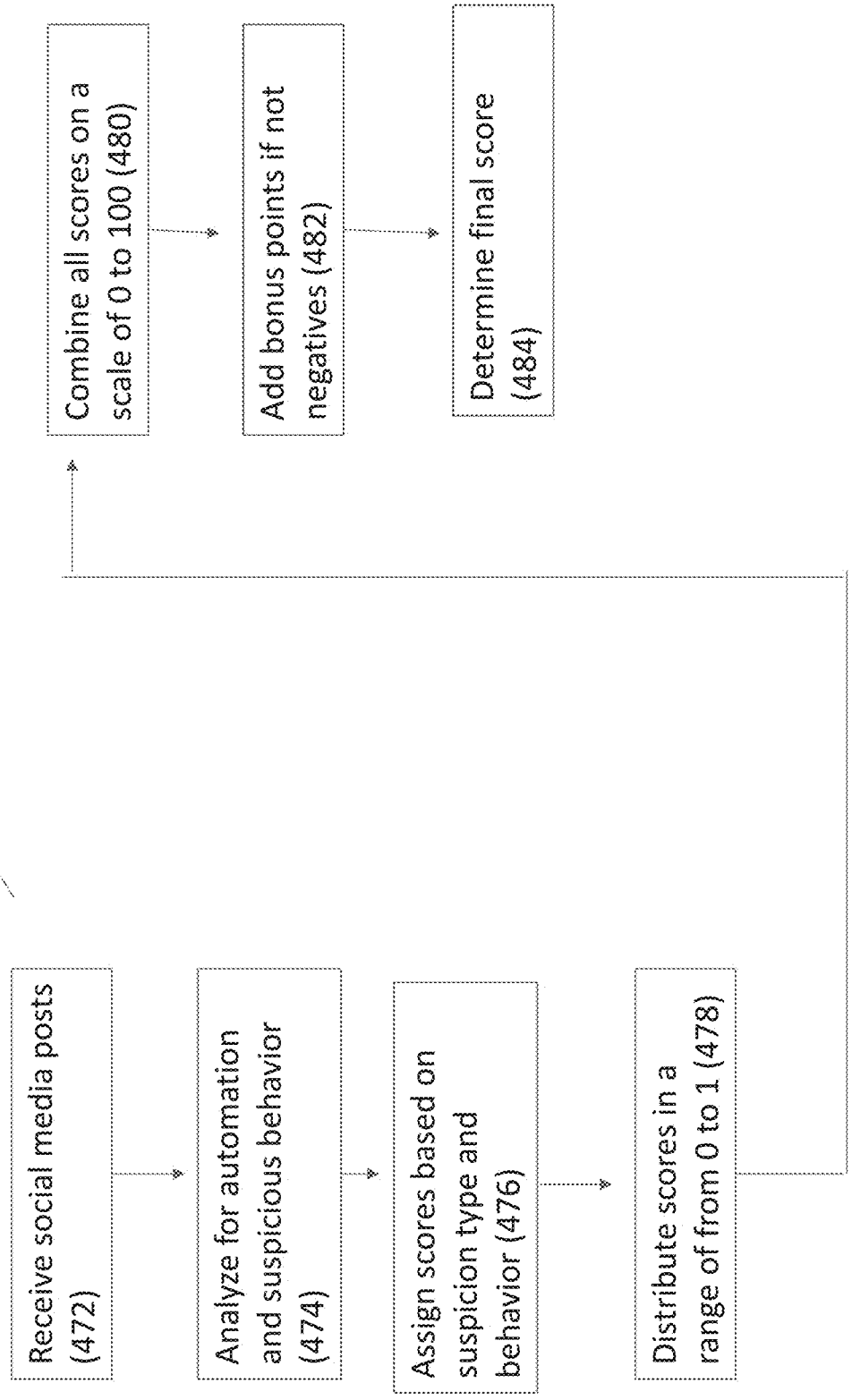

Figure 11

```
API Payload:
{
    activities: [{...some tweets}],
    allAuthors:[{...uniqueAuthors}],
    relationships:[{from:an_author_id...}],
    suspects:[author1,author2,author3,...],
    suspect2suspect:[author3,author4,...],
    humans:[author5,author6],
    usersFollowingSuspects:[author6,...],
    discoveredNetworkSuspects:[authror7,...],
    postClusters:{
        hashtags: [
            {
                text:"#foobar",
                id:12345,
                allAuthors:[author1,author3,author6],
                suspects: [author1,author3],
                botComposition: 0.66
            },
            {...},
        ],
        retweeted_authors:[...],
        entities:[...],
        story_title:[...],
        story_domain:[...]
    }
}
```

SYSTEM AND METHOD FOR SOCIAL NETWORK ANALYSIS

FIELD OF THE INVENTION

The present invention, in at least some embodiments, is of a system and method for social network analysis, and in particular, to such a system and method for detecting networks of coordinated automatic posting entities.

BACKGROUND OF THE INVENTION

Automated posting entities to social media, or "bots", frequently operated in coordinated networks. This behavior is particularly characteristic of bots which attempt to pass themselves off as human posters, for example in an attempt to influence viewers of social media. In some cases, such behavior may even lead to attempts to influence stock prices and other illegitimate behavior.

Various solutions have been proposed to detect such bot networks, to expose potentially malicious or illegitimate behavior. For example, WO2017027320A1 describes a method to detect bots for social media postings. However, the method described is very general and would not necessarily correctly detect bots. Furthermore, the method would not be useful to detect bot networks, which are more dangerous in terms of their potential influence.

BRIEF SUMMARY OF THE INVENTION

The background art fails to provide a solution to the problem of detecting automated accounts posting to social media, and particularly fails to provide a solution to detect automated account networks.

The present invention overcomes these drawbacks of the background art by providing a system and method for detecting automated account networks that post to social media.

Optionally each method, flow or process as described herein may be described as being performed by a computational device which comprises a hardware processor configured to perform a predefined set of basic operations in response to receiving a corresponding basic instruction selected from a predefined native instruction set of codes, and memory. Each function described herein may therefore relate to executing a set of machine codes selected from the native instruction set for performing that function.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 4A-4K show exemplary processes for identifying further automated account candidates, based on followers of suspect automated accounts and optionally also those that the suspect automated accounts are following;

FIG. 11 shows a non-limiting, illustrative example of an API (application programming interface) for obtaining the social medial channel information, as part of a detector API service for supporting the detection of automated accounts;

DESCRIPTION OF AT LEAST SOME EMBODIMENTS

Figure 1:
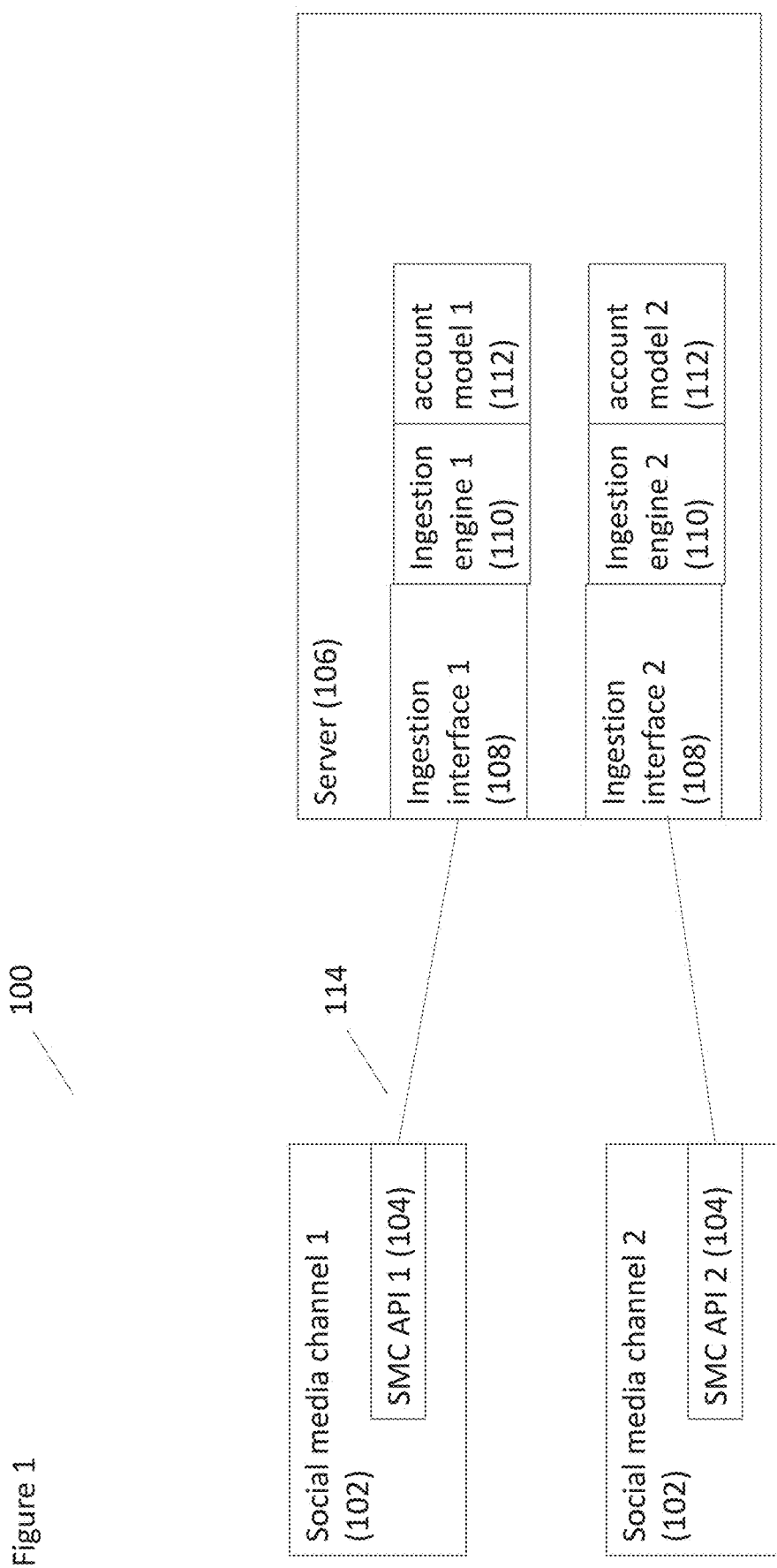
FIG. 1 shows a non-limiting, exemplary, illustrative system for detecting a plurality of automated accounts posting to social media channels.

Turning now to the drawings, FIG. 1 shows a non-limiting, exemplary, illustrative system for detecting a plurality of bots posting to social media channels. By "social media channel", it is meant a channel that permits a user to make a post thereto. Such a post may comprise text, image(s), video data, audio data or a combination thereof. Users may choose to receive posts from other users of the social media channel by "following" such one or more other users through the social media channel interface, according to the identity of such one or more other users as provided through the social media channel interface. Social media channels therefore naturally provide a network of communication between different users that follow, and/or are followed by, other users. The structure of such a network between such a plurality of users may be determined according to the flow of posts between them and/or may be explicitly provided by the social media channel.

A "bot" is an automated software which, in this example, is able to submit one or more posts to a social media channel. A bot is typically not identified as such; rather, the bot posts as though it were a human user of the social media channel. A bot can therefore be identified according to its behavior, which does not follow human social media channel posting patterns. The term "bot" is used interchangeably with an automated account or an automated user.

When a plurality of automated accounts act in concert, they are referred to as a "botnet". The description provided herein relates to detecting a plurality of automated accounts and also preferably includes determination of whether these automated accounts are networked together. The description may not relate to detection of whether the automated accounts are acting in concert. Automated accounts acting in concert have been used for nefarious purposes, such as to disparage a public company in an attempt to drive its stock price down, or to otherwise ruin the company's brand and reputation.

As shown, a system 100 features a plurality of social media channels 102, shown as social media channel 1 102 and social media channel 2 102 for the purpose of description only, and without any intention of being limiting. Each social media channel 102 comprises a corresponding SMC (social media channel) API (application programming interface) 104, shown as SMC API 1 104 and as SMC API 2 104, respectively. Each SMC API 104 supports accessing a plurality of postings to the respective social media channel 102, as well as identification of the entities making such postings (not shown). SMC API 104 also preferably provides access to a list of entities according to their networked relationship, as "followers" and/or as "followed".

A server 106 is able to communicate with SMC API 1 104 and SMC API 2 104 through a computer network 114, such as the internet for example. Server 106 operates a plurality of ingestion interfaces 108, each of which is able to receive data from a particular social media channel 102. Such interfaces 108 are shown as ingestion interface 1 108 and ingestion interface 2 108, for receiving such data from SMC API 1 104 and SMC API 2 104, respectively.

An ingestion engine 110 then receives a plurality of posts from a particular social media channel 102, as well the identity of the entity making each such post. Ingestion engine 110 also preferably receives the identity of the "followers" and "following" for each such entity. Ingestion engine 110 is shown as ingestion engine 1 110 and ingestion engine 2 110, communicating with ingestion interface 1 108 and ingestion interface 2 108, respectively. Ingestion engine 110 may optionally perform an initial analysis regarding the characterization of each entity, as a first pass to determine whether each such entity may be an automated account or a human.

The social media channel information is passed to an automated account model 112, shown as automated account model 1 112 and automated account model 2 112, communicating with ingestion engine 1 110 and ingestion engine 2 110, respectively. Automated account model 112 may optionally perform the entire analysis, regarding the characterization of each entity, to determine whether each such entity may be an automated account or a human. Alternatively automated account model 112 may perform further analysis after the first pass by ingestion engine 110.

The analysis preferably includes determining whether the entity falls into a likely automated account category based upon its posting and/or follower characteristics. This analysis, which is preferably an initial analysis, optionally features statistical measurements of entity posting behavior and follower numbers to determine whether an entity is likely to be an automated account.

As described in greater detail below, further analysis preferably includes determining the relationship between each suspect automated account entity and its followers. Followers of an automated account are more likely to be automated accounts themselves, although they may be human users as well.

Figure 2:
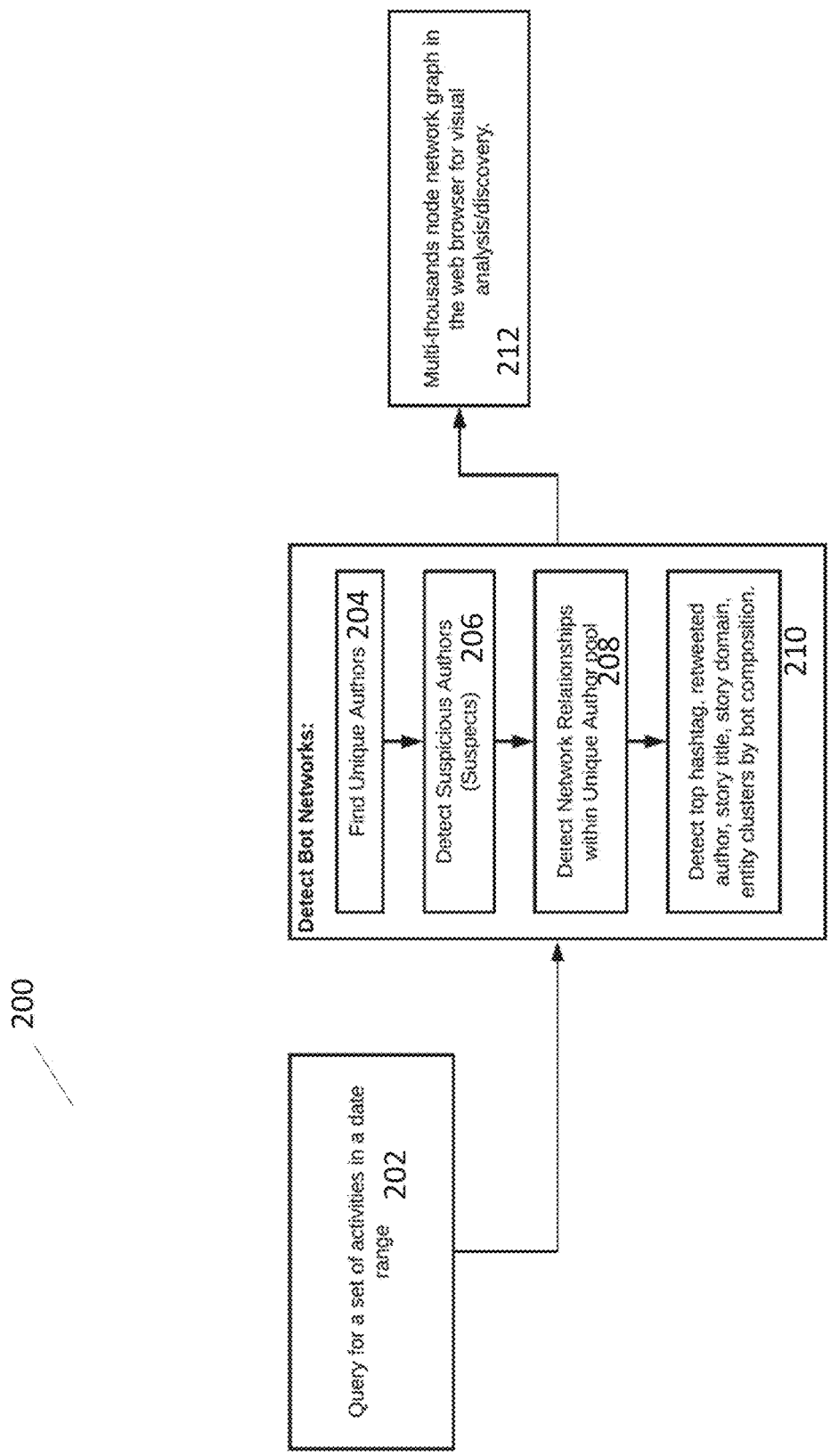
FIG. 2 shows a non-limiting exemplary process for detecting one or more automated accounts within a plurality of entities posting to social media channels.

FIG. 2 shows a non-limiting exemplary process for detecting one or more automated accounts within a plurality of entities posting to social media channels. As shown, a process 200 features sending a query for a plurality of activities, such as postings, preferably within a particular time frame, in 202. Next in 204 to 210, preferably a plurality of steps are performed to detect an automated account network, at 204, a plurality of unique authors of the social media posts are determined. This step is performed to remove any potential or actual duplicates, so that the unique authors with regard to the set of postings are detected.

In 206, suspicious entities or authors are detected, for example according to the first pass process described above. These suspicious entities may be automated accounts. In 208, network relationships within the unique author pool are determined. Optionally these relationships are determined for all authors but alternatively they are only determined for authors that are determined to be potentially suspicious.

In 210, optionally the activities performed by at least suspicious authors, but alternatively a plurality of authors or even all authors within the set of postings are analyzed. Such activities may include but are not limited to detecting the top hashtag, retweeted author, story title, story domain and entity clusters by automated account composition. This information is optionally used for static analysis, to determine the relationships between entities. For example, if one entity not only follows another suspicious entity but also amplifies that suspicious entity's postings, then this entity is more likely to be considered to be suspicious itself. For example, for the social media channel Twitter, retweeting (that is, reposting) a tweet from a suspicious entity may be used as an indication that the reposting entity is itself more likely to be an automated account.

Optionally, analysis of dynamic behavior of the entities may also be used to determine likelihood of a connected entity being a suspicious entity, and more likely to be an automated account. For example, if a follower entity of a suspected automated account entity rapidly reports or otherwise amplifies the postings of the suspected automated account entity, that is an indication that the follower entity is also an automated account. Static analysis may be used without dynamic analysis, and vice versa.

Optionally these relationships and also optionally their activities are plotted in a visual manner in 212.

Figure 3A:
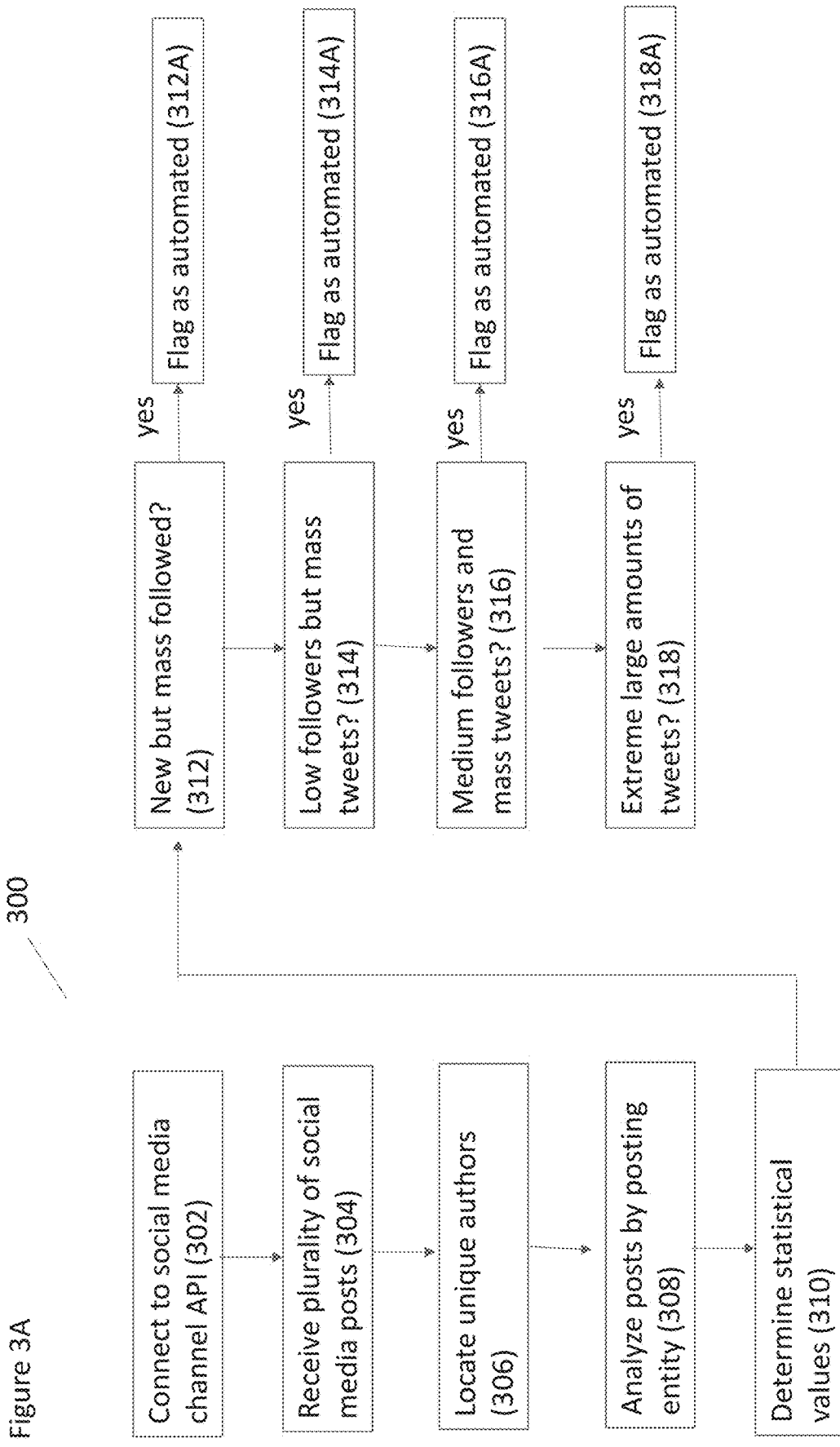
FIGS. 3A and 3B show two different non-limiting, exemplary processes for detecting one or more suspicious entities that may be automated accounts.
Figure 3B:
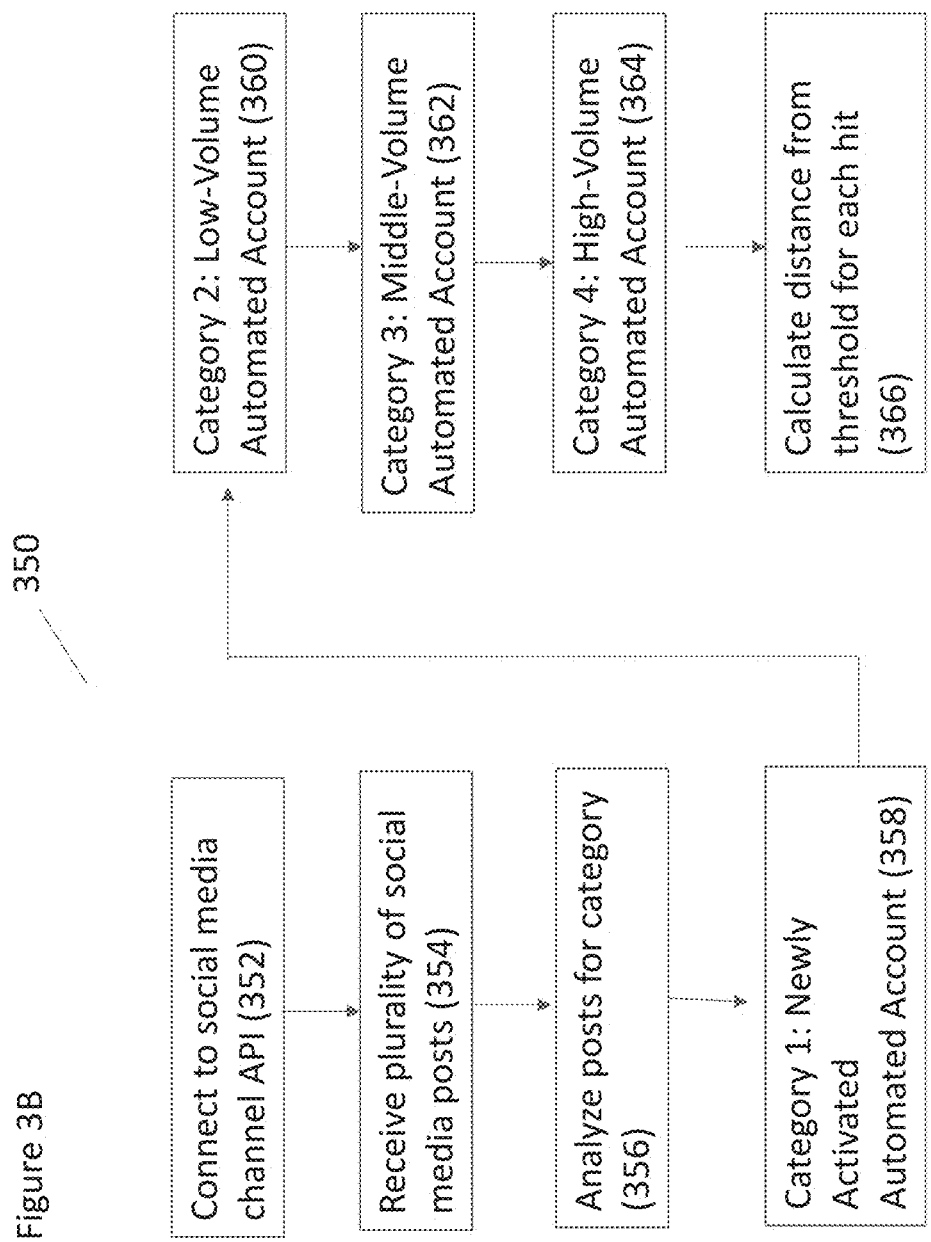

FIGS. 3A and 3B show two different non-limiting, exemplary processes for detecting one or more suspicious entities that may be automated accounts. Turning now to FIG. 3A, as shown, a process 300 begins with connecting to a social media channel API at 302 as previously described, in order to obtain a plurality of social media posts. In 304 the social media posts are received, for example by the previously described ingestion engine. The unique authors are identified in 306. The posts are then analyzed by posting entity in 308. Statistical values for the postings are then determined in 310, in particular with regard to the ratio of followers to tweets.

These values are then preferably passed through a series of filters in order to determine whether the posting entity is a suspect automated account. The filters may use one or more of the following calculations:

1. Ratio of the number of followers to the number of postings: foll_count/post_count.
2. Total number of postings: post_count
3. Sum of the number of followers and the number of postings: foll_count+post_count
4. Whether the number of followers is larger than the number of postings: post_count<foll_count
5. The absolute value of the number of followers minus the number of postings: foll_count−post_count Not all categorizations of an entity as suspicious may use all of these filters and/or may use different filters. Non-limiting examples of how a plurality of such filters may be applied include:

1. Brand New Mass Followed: A suspect in this category is filtered in 312. The behavior of such a suspect may for example include the following non-limiting categorization: a few thousand followers and 10 posts, such as 10 tweets for example; 3,000 followers, 49 posts; 1.2,000 followers, 11 posts; or 4,000 followers, 39 posts. This example is characterized by a significantly high ratio of followers to posts, which is not a typical pattern for a human user of social media. These followers may be other automated accounts and this entity may be part of a botnet. Preferably, the filters are applied as follows in this non-limiting example for Twitter. In this and the other examples provided herein, different filters and/or values of the values may be applied for different social media channels. Non-limiting examples of the filters that are applied and their values as applied may include:

A. foll_count/post_count is optionally from 1 to 500, preferably from 5 to 200 and more preferably from 6 to 100.

B. post_count is optionally less than 2000, preferably less than 1500, more preferably less than 1000 and most preferably less than 500.

C. foll_count+post_count is optionally from 500 to 25,000; preferably from 1000 to 20,000; more preferably from 1500 to 15,000; and most preferably from 2000 to 10,000.

D. post_count<foll_count is preferably true (that is, this condition is true for the entity).

Entities that fall within at least one and optionally all of these filters are preferably flagged as suspect automated accounts in 312A.

2. Newer Suspects: A suspect in this category is filtered in 314. The behavior of such a suspect may for example include the following non-limiting categorization: 5 followers, 2000 posts; 30 followers, 2,000 posts; 8 followers, 3,000 posts; 5 followers, 1500 posts; or 2 followers, 2,000 posts. This example is characterized by having a high ratio in the other direction, with a significant overbalance between posts and followers. Again, this is not a typical pattern for a human user of social media. Non-limiting examples of the filters that are applied and their values as applied may include:

A. foll_count/post_count is optionally less than or equal to 1, preferably less than or equal to 0.5, more preferably less than or equal to 0.1, and most preferably less than or equal to 0.05.

B. foll_count+post_count is optionally less than 10,000; preferably less than 7500; more preferably less than 5000; and most preferably less than 3000.

Entities that fall within at least one and optionally all of these filters are preferably flagged as suspect automated accounts in 314A.

3. Middle Age Suspects: A suspect in this category is filtered in 316. The behavior of such a suspect may for example include the following non-limiting categorization: 1800 followers, 30,000 posts; 500 followers, 10,000 posts; 700 followers, 20,000 posts; or 600 followers, 30,000 posts. This behavior still has many more posts than followers, with a ratio that is again overbalanced. Again, this is not a typical pattern for a human user of social media. Non-limiting examples of the filters that are applied and their values as applied may include:

A. foll_count/post_count is optionally less than or equal to 1, preferably less than or equal to 0.5, more preferably less than or equal to 0.1, and most preferably less than or equal to 0.05.

B. foll_count+post_count is optionally from 1000 to 75,000; preferably from 2500 to 60,000; more preferably from 5000 to 50,000; and most preferably from 10,000 to 40,000.

Entities that fall within at least one and optionally all of these filters are preferably flagged as suspect automated accounts in 316A.

4. Well Established Suspects: A suspect in this category is filtered in 318. The behavior of such a suspect may for example include the following non-limiting categorization: 2000 followers and 100,000+posts; 5700 followers, 500,000 posts; 400 followers, 45,000 posts; or 800 followers, 57,000 posts. This behavior may also be related to a very large number of postings such as a very large number of tweets for example. This example also has many more posts than followers, with a ratio that is again overbalanced. Again, this is not a typical pattern for a human user of social media. Non-limiting examples of the filters that are applied and their values as applied may include:

A. foll_count/post_count is optionally less than or equal to 1, preferably less than or equal to 0.5, more preferably less than or equal to 0.25, and most preferably less than or equal to 0.015.

B. The absolute value of foll_count-post_count is optionally greater than or equal to 50,000; preferably greater than or equal to 25,000; more preferably greater than or equal to 15,000; and most preferably greater than or equal to 10,000.

Entities that fall within at least one and optionally all of these filters are preferably flagged as suspect automated accounts in 318A.

An exemplary analysis was performed with all filters required to be applied with the above values set at their most preferable values in order for a suspicious entity to fall into one of the above categories. This analysis was demonstrated to identify up to 50% of the automated accounts in academic bot datasets (cresci-2017; https://botometer.iuni.iu.edu/bot-repository/datasets.html). In some categories (HR Spambots) up to 77% of automated accounts were identified.

Optionally, alternatively or additionally, an base score may be calculated in order to flag suspicious social media accounts. For example, the process of calculating such a score may start by calculating a ratio of followers:posts counts per the user to assign a base score that indicates whether an account has behavior that is suspicious, near suspicious, or not suspicious. This value is a base metric that may be augmented further down the processing pipeline with other modeling components.

FIG. 3B relates to a non-limiting, exemplary process for calculated such a base score. As shown, a process 350 begins with connecting to a social media channel API at 352 as previously described, in order to obtain a plurality of social media posts. In 354 the social media posts are received, for example by the previously described ingestion engine.

At 356, the social media posts are analyzed for category. Preferably each category is considered separately. Optionally once the social media account is determined to fulfill the criteria for a particular category, then the process does not continue for further categories. Preferably, even once the social media account is determined to fulfill the criteria for a particular category, the process continues to determine whether the criteria for a further category may be applicable.

As illustrated in each image below, the ratio of posts/followers (or of followers/posts, also used below in exemplary implementations) and volume of posts+followers determine if an account is suspicious. The thresholds per each volumetric group (category 1-4) are a cutoff point of too much activity for a particular volumetric growth phase of the account.

Over time the volume of post+followers (that is, posts plus followers), for a human user, is expected to grow organically to a reasonable plateau or at least to a reduced rate of growth. Automation may be predicted for accounts that reach a particular plateau, yet continue to post far too often. For such accounts, preferably additional tests are performed.

One such additional test is the determination of a distance. For each such category, more preferably the distance to the threshold is determined as shown. For example, the distance measurement may be used to see how much post volume they are generating versus how much volume a user in this category should normally have. The greater the distance to the threshold, the less likely that an account belongs to a particular category. As illustrated below, the thresholds are preferably cut-offs that sort accounts according to whether they are at the threshold or within a close negative distance.

The effect of distance may also depend upon the category being considered. As illustrated below, with four categories, category 1 accounts are considered to be clearly human. Optionally a more rigorous requirement is applied to determine whether an account fulfills the category 1 criteria. Also optionally additional requirements are applied.

In 358, the social media posts are analyzed in relation to category 1, which relates to a newly activated automated account. A non-limiting example relates to a social media account which has 9000 posts but only 11 followers.

In 360, the social media posts are analyzed in relation to category 2, which relates to a low volume automated account. A non-limiting example relates to a social media account which has about 50,000 posts, but only 500 followers.

In 362, the social media posts are analyzed in relation to category 3, which relates to a middle volume automated account. A non-limiting example relates to a social media account which has about 85,000 posts, but only 125 followers.

In 364, the social media posts are analyzed in relation to category 4, which relates to a high volume automated account. A non-limiting example relates to a social media account which has about 335,000 posts, but only 500 followers.

In 366 the distance from the threshold for each category that was a hit or that was applicable is preferably calculated.

For example, information that may be further considered for detecting an automated account within a processing pipeline includes but is not limited to the ratio of the number of followers to number of friends: foll_count/friends_count. In this non-limiting example, the number of followers relates to the number of other accounts that have chosen to follow this account. The number of friends relates to the number of accounts that this account has chosen to follow. Another non-limiting example of further information that may be used includes the identification of support application software used for posting. Non-limiting examples of such support application software include Twitter for iPhone, Zapier, TweetDeck, IFTTT (if this then that, an automation software service), Buffer and optionally others. Certain types of support application software are more likely to be used by an automated social media account, or bot, rather than a human operated social media account.

Figure 4B:
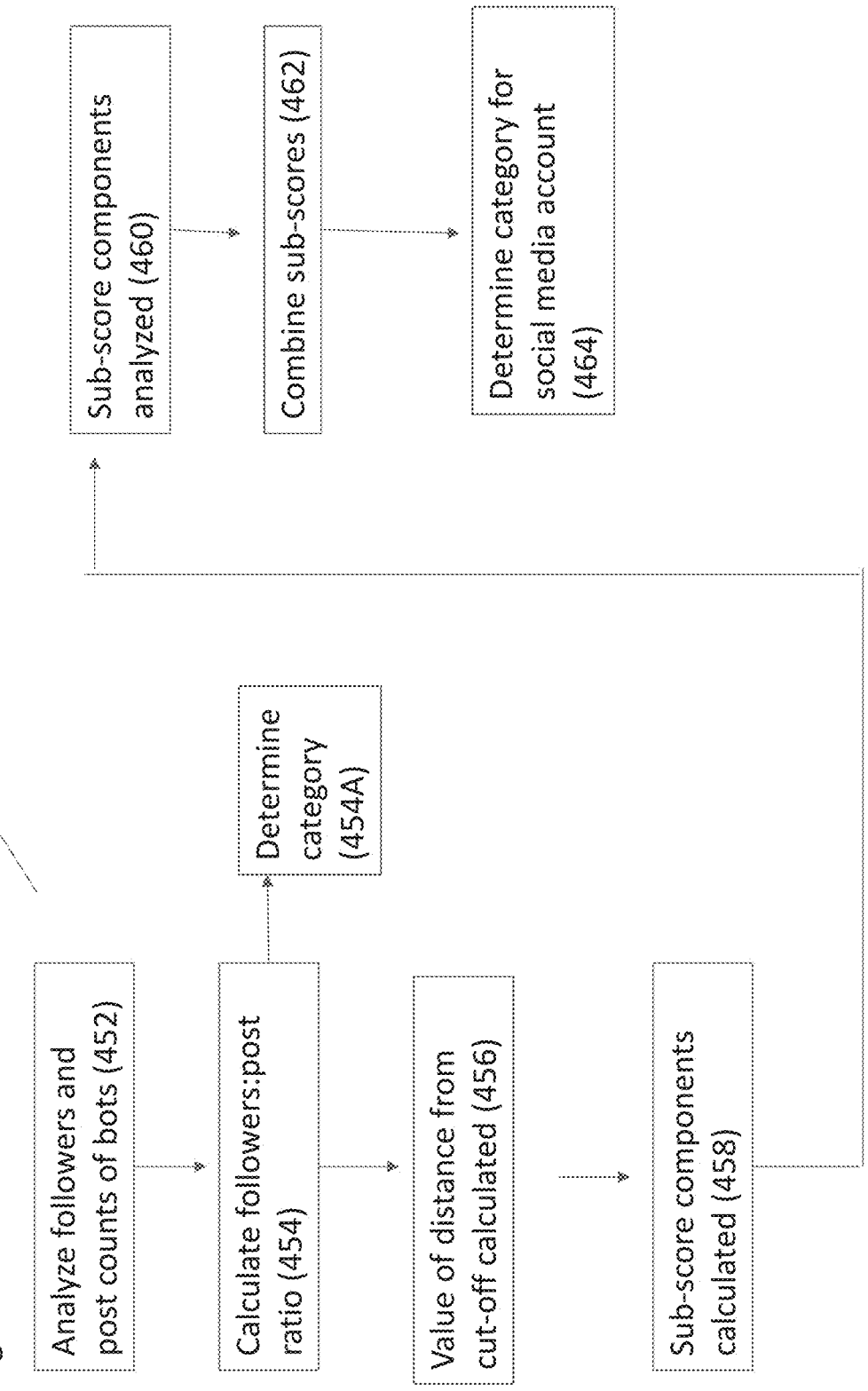

FIGS. 4A-4K show exemplary processes for identifying further automated account candidates, based on followers of suspect automated accounts and optionally also those that the suspect automated accounts are following. Such processes preferably analyze the network of connections between the suspect automated accounts and other entities. They may also optionally further analyze the behavior of the additional entities to determine whether they are suspect automated accounts. FIGS. 4A-4B and 4G relate to particular methods, while FIGS. 4C-4F and 4H-4K show non-limiting examples of accounts that fall within a category or that do not fall within a category.

Turning now to FIG. 4A, as shown in a process 400, followers of the suspect automated accounts are analyzed in 402. Optionally such followers are only analyzed if their postings are present in the batch of postings being analyzed. Such a requirement may be imposed to for example remove any inactive or less active entities, as one hallmark of an automated account entity is the tendency toward actively posting.

If a previous suspect entity is located again in 404, then it is preferably flagged as an automated account in 404A. Such an automated account may be particularly categorized as being connected to another automated account. In other words, such automated accounts are categorized as suspect automated accounts that are connected to other suspect automated accounts.

In 406, optionally a plurality of filters are applied to the suspect entities. As previously described, not all categorizations of an entity as suspicious may use all of these filters and/or may use different filters. These filters may be similar to those applied previously but with different values. Optionally these different values are more relaxed, or more likely to result in a suspect entity being determined to be an automated account, because following an automated account means that an entity is more likely to itself be an automated account. Non-limiting examples of the filters that are applied and their values as applied may include:

A. foll_count/post_count is optionally less than or equal to 0.5, preferably less than or equal to 0.25, more preferably less than or equal to 0.15, and most preferably less than or equal to 0.1; it may even be less than or equal to 0.08.

B. The absolute value of foll_count−post_count is optionally less than or equal to 100,000; preferably less than or equal to 250,000; more preferably less than or equal to 500,000; and most preferably less than or equal to 600,000.

In 408, it is determined if one or more, and preferably both, of the above filters turns out to be true for a suspicious entity. If so, then in 408A the suspicious entity is determined to be an automated account. Non-limiting examples of entities that match the above filters include 2500 followers, 40,000 posts; or 1900 followers, 173,000 posts.

An exemplary analysis was performed with all filters required to be applied with the above values set at their most preferable values in order for a suspicious entity to fall into one of the above categories. This analysis was demonstrated to identify up to 80% of the automated accounts in academic bot datasets (cresci-2017; https://botometer.iuni.iu.edu/bot-repository/datasets.html).

While entities that automated accounts follow may be considered less important for the above analysis, optionally they are included because automated accounts are typically part of an automated account network, with behavior that is controlled for the automated accounts as a group within the network. Optionally in 410, the entities that automated accounts follow are analyzed. If a previous suspect entity is detected again in 412, then such a suspect entity is determined to be an automated account in 412A. Optionally only suspect entities that were not previously flagged as definitely being automated accounts are considered.

In 414, the process is optionally performed again, to recursively examine at least automated account followers and also optionally the entities that are followed. The process may be performed repeatedly until no more entities are available for analysis.

FIG. 4B relates to a non-limiting, exemplary process or pipeline for calculating a base score, and then preferably further augmenting this calculation with additional processing. A process 450 begins by analyzing followers and post counts for a particular social media account, in 452. Next an base score is prepared in 454, by calculating a ratio of followers:posts counts per the user to assign a base score. The base score is then used to assign the user (social media account) to a particular category as suspicious, near suspicious, or not suspicious, in 454A. Next a value of the distance from the cutoff point of being suspected as an automated account (or "bot") is calculated in 456. As noted above, the distance is preferably used to determine how close an account is to a particular category. More preferably, an account is determined to fall within a category only if the distance is negative, and not positive.

In 458, the sub-score components are calculated. Non-limiting examples of the sub-score components are given below. In 460, the sub-score components are analyzed to determine whether they are more likely to indicate a human user who is posting through the social media account, or an automated account.

In 462, preferably the outputs of each sub-score component are combined to yield a single 'automation score', which is a score between 0:100 that indicates how automated (0) or human (100) an account is likely to be. For example:

A score of 0-33 would indicate heavy automation
A score of 44-55 seems slightly suspicious
A score of 65-100 indicates a human operated account.

The higher the score, the more certainty there is that the social media account is a human account.

In 464, a category for the social media account as human, somewhat suspicious as being automated or very suspicious as being automated may be assigned.

Non-limiting examples of how to calculate exemplary sub-score components are given below.

Sub-Score Component 1: Intent

Intent is a metric that aims to measure perceived influence on Twitter. In a perfect world, to look influential a user will want most an off-the-shelf influence score to resemble somebody famous or influential.

For instance: A celebrity might have a million plus followers, follow 100 users him or herself, and have a normal (not abnormally high) volume of a thousand to few thousand posts on their timeline.

Given that at least some users may try to boost fake influence, the Intent sub-component is used to programmatically assign a score of just how influential the user seems by the ratios and counts of their followers, friends, and posts.

Optionally intent has two parts. In a first part, it is determined whether the account has more followers than friends. If not, then the account is labeled as having low or no intent. Next, in a second part, the ratio of followers to friends is determined, and is then placed on a scale of from 0 to 1. For example, to achieve a score of 0.8 (or 80, if the scale is 1 to 100), then the account needs to have a ratio of followers to friends of at least 128. To achieve a score of 0.4, the ratio of followers to friends needs to be at least 2. Optionally the relationship between the ratio of followers to friends and the final score is adjusted according to the trends for such ratios across a plurality of accounts, as these numbers may change over time, according to the popularity of a particular type of social media for example.

Figure 4C:
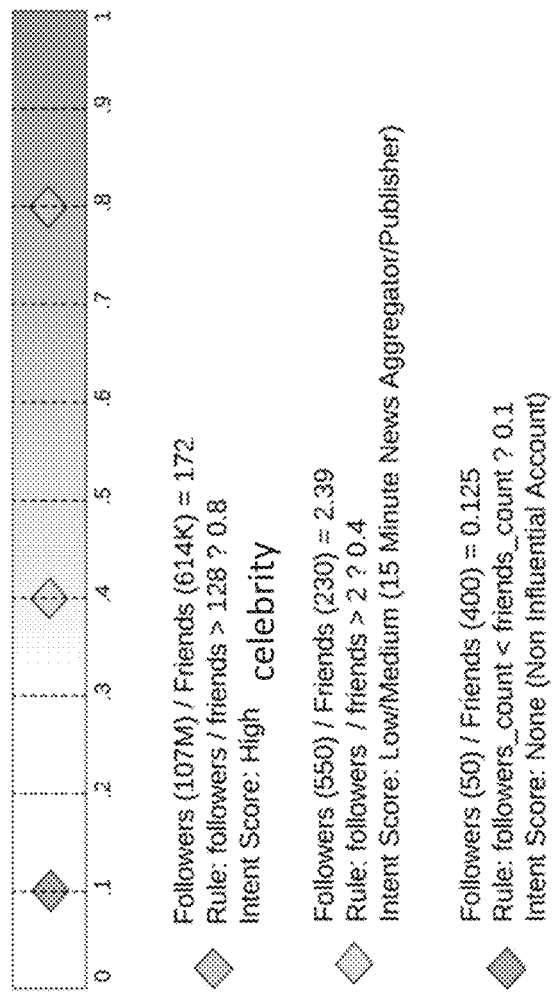

FIG. 4C shows a non-limiting example of a calculation of an intent score for a celebrity (blue diamond) in comparison to a news aggregator or publisher, that publishes news every 15 minutes (yellow diamond), and a non-influential account (orange diamond). As shown, the celebrity clearly has high intent, given the huge number of followers in comparison to the limited number of friends. However it is expected that other criteria for automation, such as spamminess, would not be fulfilled and so such an account would not be mislabeled. In addition, verified social media accounts may automatically be excluded from consideration of automation, even if they show high intent.

Sub-Score Component 2: Spamminess

Preferably the Spamminess sub-component is calculated after the influence sub-score. Spamminess will augment both the final score as well as the Automation Sub-Score component.

Spamminess may start by using the initial 'base score' value, the Intent sub-score, and the volume of posts to determine a spamminess score. Higher volume of posts would tend to increase the spamminess score, as would behavior that indicates a push to appear influential for intent. The original base score also indicates the extent to which a social media account may be operated by an automated account.

If a user has a higher spamminess score and a high intent to appear famous (fake famous), then a higher automation score is calculated in the final steps. That is, a worse (more automated) automation score is calculated if the user seems to be attempting to be too spammy and seem to be trying to look influential. A truly influential user would not engage in spammy behavior.

Conversely, a human account from a user who overposts, for example, will not get marked as an automated account or further augmented negatively because of examining one metric alone. A multi-component approach makes it easier to separate human vs automated behaviors.

As a non-limiting example, spamminess may be used to detect mid-level volume accounts that have higher than average post volumes than accounts should have at their growth phase (preferably determined by the number followers). Optionally, a hard cut-off rule is also used, such that for example (Posts+Followers) in all cases must be >=50K and <=130K in order to receive any spamminess subscore. Optionally, only one side of the hard cut-off ruler is used, for example, posts plus followers must be at least a certain amount, such as greater than or equal to 50,000. High volume spammers are preferably determined by Intent+base score.

Figure 4D:
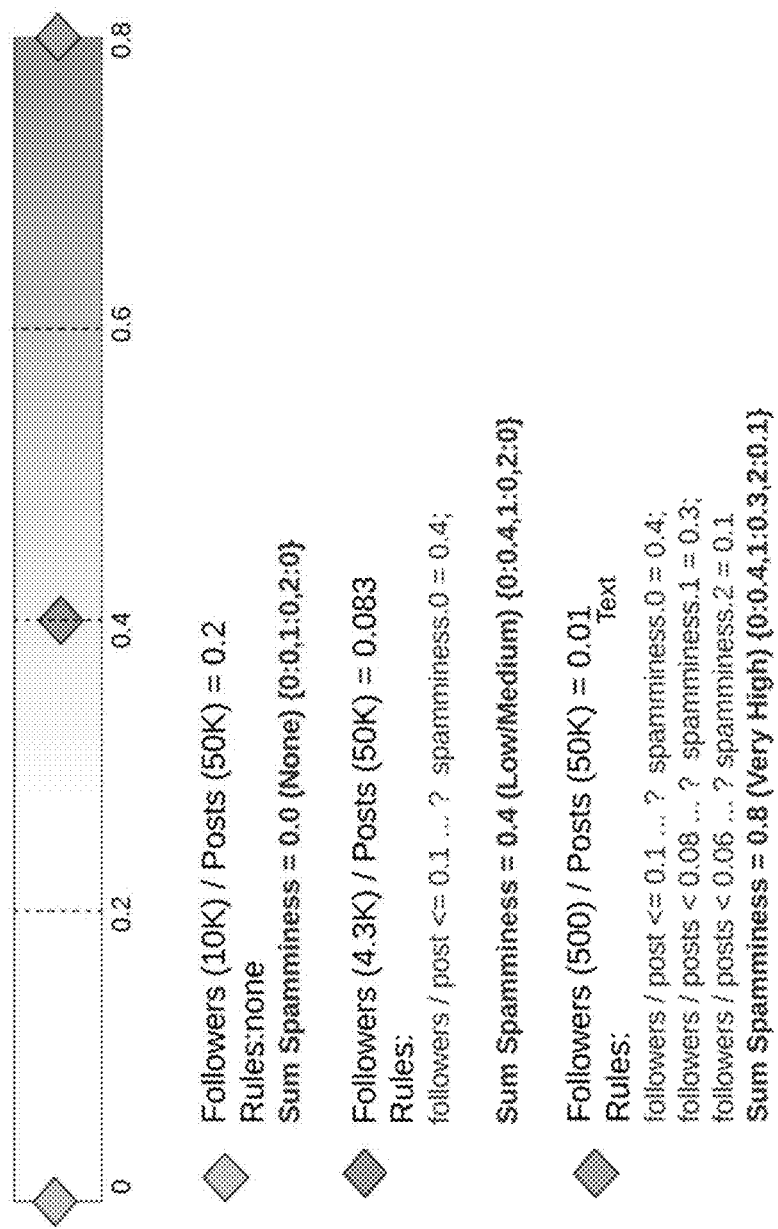

FIG. 4D shows a non-limiting example of calculating spamminess with the optionally minimum cutoff applied. All three accounts meet the cut-off rule. None of them are excluded from further consideration by meeting the above described intent threshold (calculations not shown). Three different scores are then applied and added up, assuming that the accounts meet the cut-off rule and are not excluded due to intent.

If followers_count/post_count is less than or equal to 0.1, a spamminess 0 score of 0.4 is applied. If followers_count/post_count is less than or equal to 0.8, a spamminess 1 score of 0.3 is applied. If followers_count/post_count is less than or equal to 0.06, a spamminess 2 score of 0.1 is applied. All of these spamminess scores are then added up. The more criteria that an account falls into, the higher the spamminess score.

The blue diamond account has a spamminess score of 0 as the ratio of followers to posts is equal to 0.2, above all of the score cut-offs. The purple diamond has a spamminess score of 0.4, which is considered to be low to medium spamminess. The orange diamond has a high spamminess score of 0.8, the maximum score possible.

Sub-Score Component 3: Automated Behaviors

This component detects automated behavior signatures using the previous sub-score components. It may be used to augment the overall 'automation score' that is computed in the final step.

This step uses the 'base score' as initially calculated, the intent and spamminess sub-scores, the author post count, the followers and friends counts, and the author_application to determine an automated behavior sub-score between 0 and 1 as Light Automated, and above 1 to 2 as Heavily Automated. The author_application for example relates to various types of software that may be used to post to an account. Software that is more heavily associated with automation would increase the automated behavior subscore. Optionally the base score distance is used in addition to, or in place of, the base score. Also optionally a verification score is applied, as some types of social media have a mechanism to determine whether the entity posting (or at least owning the account) is a human being. Such verified accounts may be excluded from automation or alternatively may receive a lower automation behavior subscore as a result.

A score of 1 might have been assigned in the case an account has 300K posts, and a high intent+spamminess score, but is posting from 'Twitter for iPhone' application.

A score of 2 might have been assigned in the case an account has 300K posts, a high intent+spamminess score, and posted from 'Zapier.com' which is a known automation tool.

A low score of 0.5 might have been assigned if for example an account has 40K posts, a medium/low intent+spamminess score, but posted from 'TweetDeck' a known automated publishing tool.

Figure 4E:
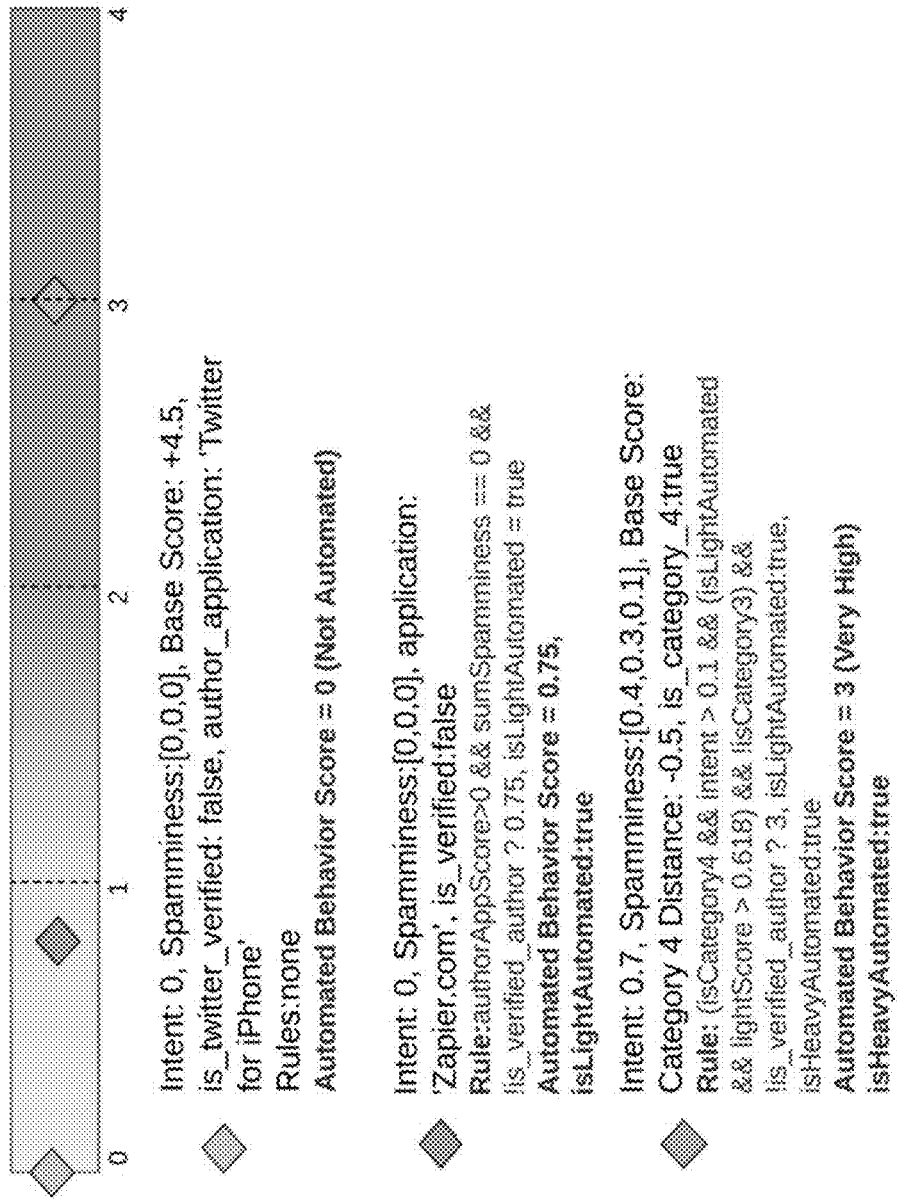

FIG. 4E relates to a non-limiting example of various accounts and their automated behavior score. As shown, the blue diamond fits into none of the rules for automated behaviors and so receives a 0 subscore. The purple diamond is an account that uses automation software to post to social media (Zapier), but fits none of the other criteria; it receives an automation behaviors subscore of 0.75, which is lightly automated. The orange diamond represents an account that has an automation behaviors subscore of 3, which is considered to be heavily automated. This account is very spammy and fits into category 4, which as described in greater detail below is very likely to be automated. Here high intent clearly does not relate to the behavior of an actual influencer.

Final Scoring Procedure

Preferably, 462 also includes applying each of the component sub-scores to augment the 'automation score base' into a final 'automation score' ranged from 0 to 100, where 0 is automated, 100 is human. The above scores are preferably included, for example including intent, base score (and/or base score distance), spamminess, automated behaviors, post count, follower count and social media verification (if available). The process starts by assuming all users are human. Any combination of negative sub-score qualities will impact the final score outcome. In the event a user has no seriously negative sub-score qualities, the process may optionally give bonus scores to ensure they get marked as human.

Figure 4F:
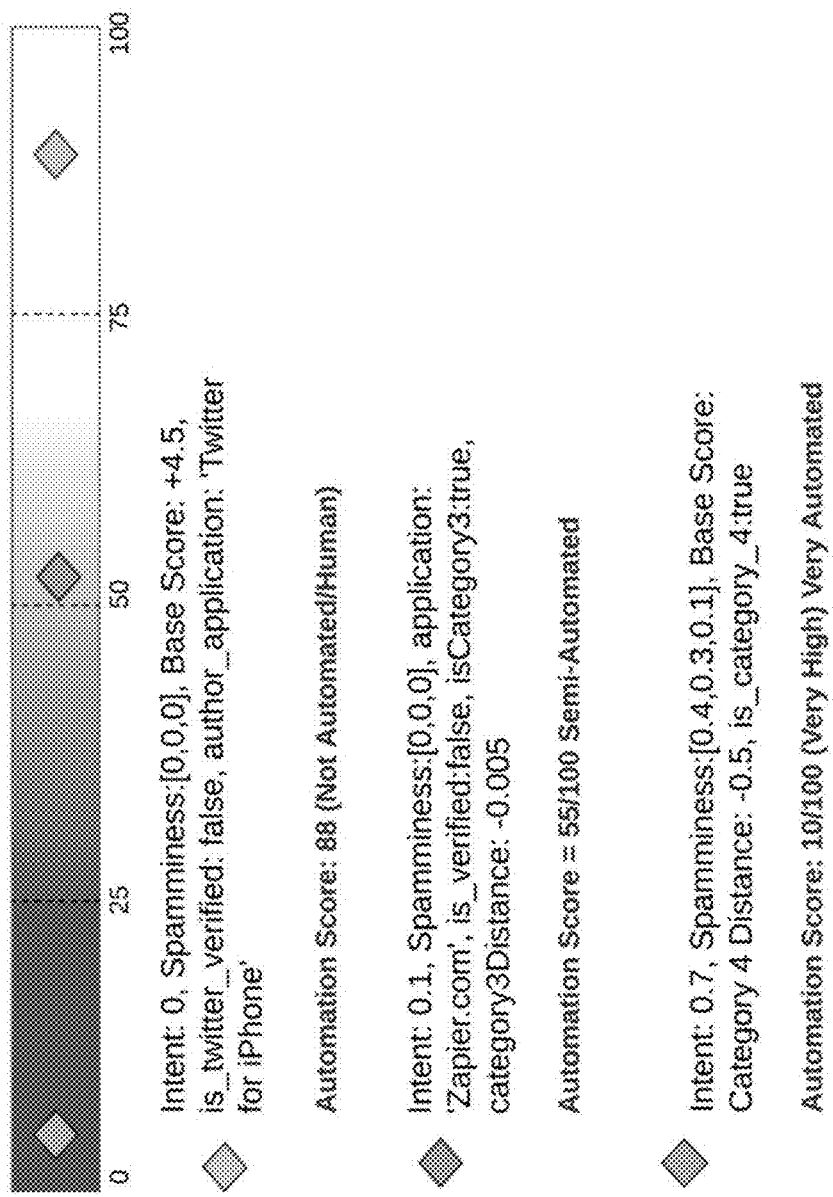

FIG. 4F relates to non-limiting examples of final scores. The blue diamond shows an account with a final score of 88, which is likely to be human operated. Factors as shown include low intent, low spamminess, being social media verified, not using automation to post and the base score. The purple diamond shows an account with a final score of 55, which is likely to be semi-automated. Factors as shown include low intent and spamminess, but also the use of automation to post and being definitively in category 3 (see below for more details regarding the categories). The orange diamond shows an account with a final score of 10, which is very likely to be automated. Factors as shown include high intent, high spamminess and being definitively in category 4.

FIG. 4G relates to another non-limiting exemplary process for calculating an overall score for automation. As shown in a process 470, the process begins by receiving a plurality of social media posts at 472. Next the posts are analyzed for automation and suspicious behavior at 474. In a second round, the posts are assigned scores based on suspicion type and automated behavior at 476. Then the scores resulting from 476 are distributed in a range of from 0 to 1 in a process at 478.

Additionally, preferably all scores are combined, including all sub-scores as described above, and distributed in a range of from 0 to 100 at 480. Optionally bonus points are given at 482 if the account has no negatives associated with it. At 484, a final score is given, with 0 being clearly automated and 100 being clearly human.

FIGS. 4H-4K relate in particular to non-limiting examples of category determinations. Preferably the categories are determined in the order shown, starting with category 1 (human operated account) and ending at category 4 (definitely automated or a "bot" account). In this preferred order, all accounts may start as being category 1, and then are eliminated from each subsequent category in order—so if they fail the criteria for category 1, they are considered for category 2; if they fail the criteria for category 2, they are considered for category 3; and if they fail the criteria for category 3, then they automatically fall into category 4. If for some reason they do not meet the criteria for category 4, the accounts may then be flagged for manual investigation.

Alternatively, the categories may be applied in reverse order (from category 4 to category 1). Also alternatively, all categories may be applied and only those that the account passes may be further considered.

The score for the threshold for separating categories preferably relates to the ratio of followers to posts (followers_count/post_count).

Figure 4H:
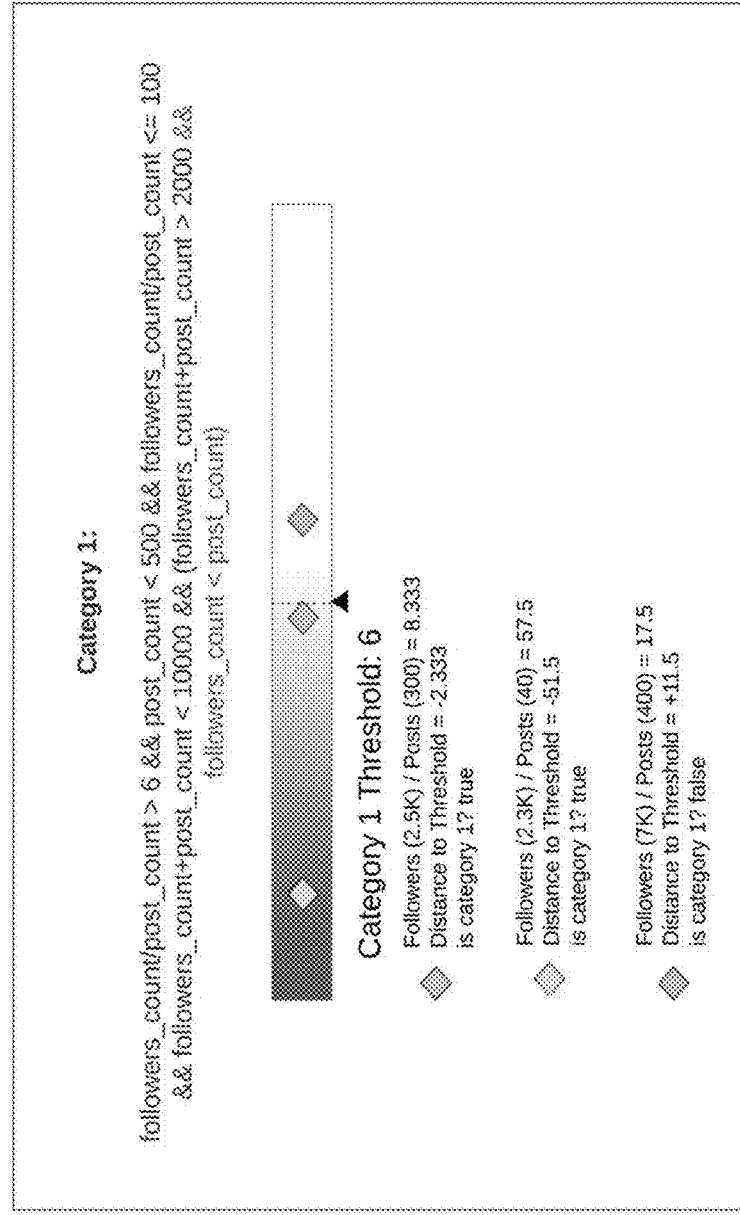

FIG. 4H shows the threshold for category 1, an account that is definitely operated by a human, as having a ratio of at least 6. To be included within this category, an account preferably has to fulfill certain additional rules. In this non-limiting example, such rules include at least one, but preferably all, of the following cut-offs: post_count<500, followers_count/post_count<=100, followers_count+post_count<10000, followers_count+post_count>2000, followers_count<post_count. For example, if an account is just getting started, it shouldn't have more followers than posts. This may indicate an account that is too low volume to have its behavior measured accurately. Of course, other cut-offs may be used in place of the above cut-offs.

More preferably, as previously described, a distance to the threshold is also calculated and that distance is used to determine whether the account belongs in a particular category. The distance is calculated by subtracting the ratio of followers to posts from the threshold. Most preferably, a negative distance is required, rather than a positive distance.

As shown in FIG. 4H, the blue and yellow diamonds both meet the threshold criteria with a negative distance. The green diamond has a positive distance and so does not meet the category 1 criteria.

Figure 4I:
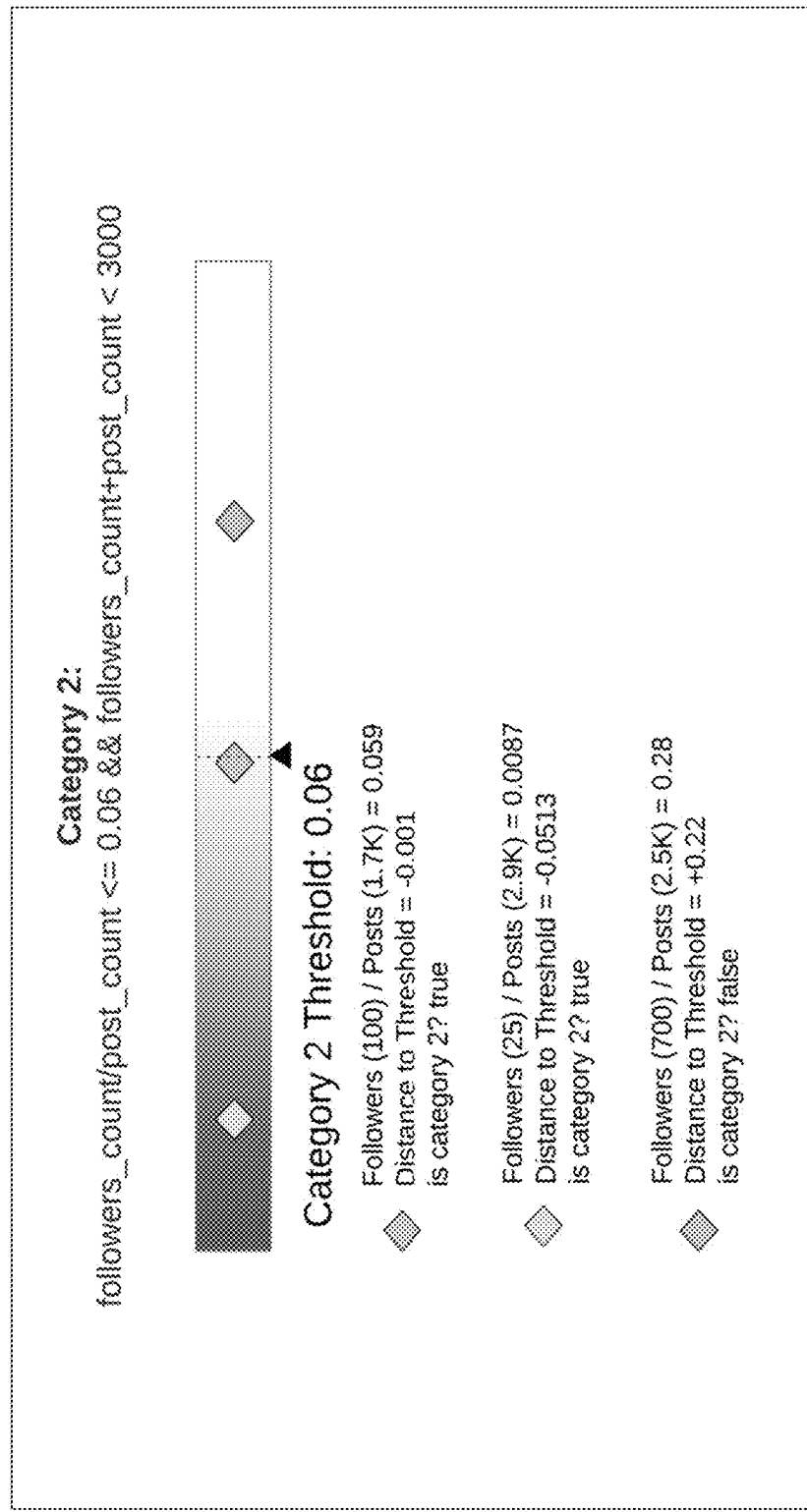

FIG. 4I relates to category 2 accounts. The threshold for the ratio of followers to posts is 0.06 in this non-limiting example, such that the ratio is at or below 0.06. These are accounts which are more likely to be at least semi-automated. Optionally a hard cut-off criteria is applied, such as for example followers_count+post_count<3000.

The blue diamond represents an account that is slightly below the threshold with a negative distance and so qualifies. Similarly, the yellow diamond represents an account that is below the threshold with a negative distance and so qualifies. However, the green diamond represents an account that is above the threshold with a positive distance, and so does not qualify.

Figure 4J:
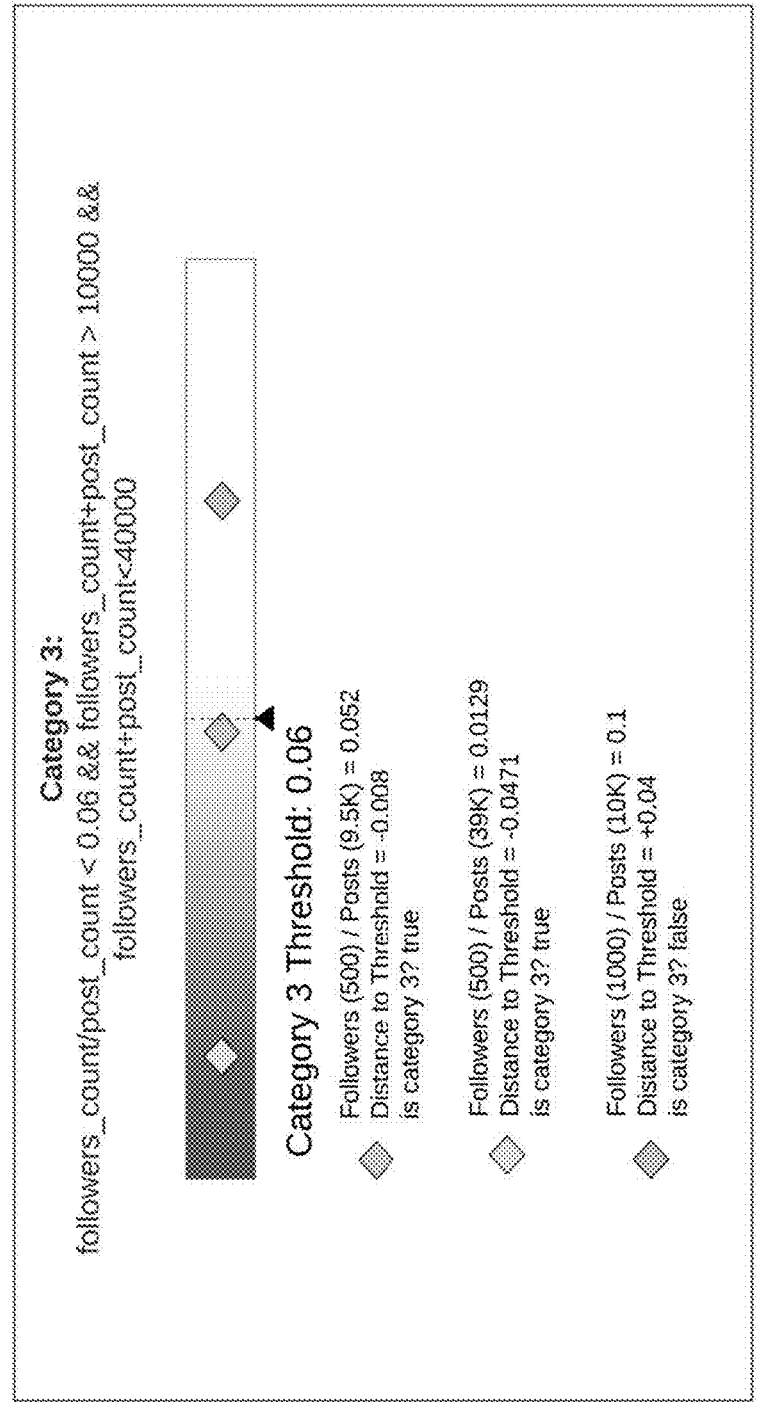

FIG. 4J relates to category 3 accounts, which are more automated than category 2 accounts. The threshold for the ratio of followers to posts is 0.06 in this non-limiting example, such that the ratio is at or below 0.06. This ratio is optionally the same as for category 2, but additional criteria are applied to distinguish the categories. The ratio may also be different (for example, 0.6 for category 2 and 0.06 for category 3).

For this non-limiting example, the additional hard cut-off criteria include followers_count+post_count>10000 and followers_count+post_count<40000, so that a range for the total number of followers and posts is preferably from (or above) 10,000 (10K) to (or below) 40,000 (40K). Again accounts represented by the blue and yellow diamonds have a ratio below 0.06, with a negative distance to the threshold, and so meet the criteria for category 3. An account represented by the green diamond has a score above the threshold, with a positive distance, and so does not meet the criteria.

Figure 4K:
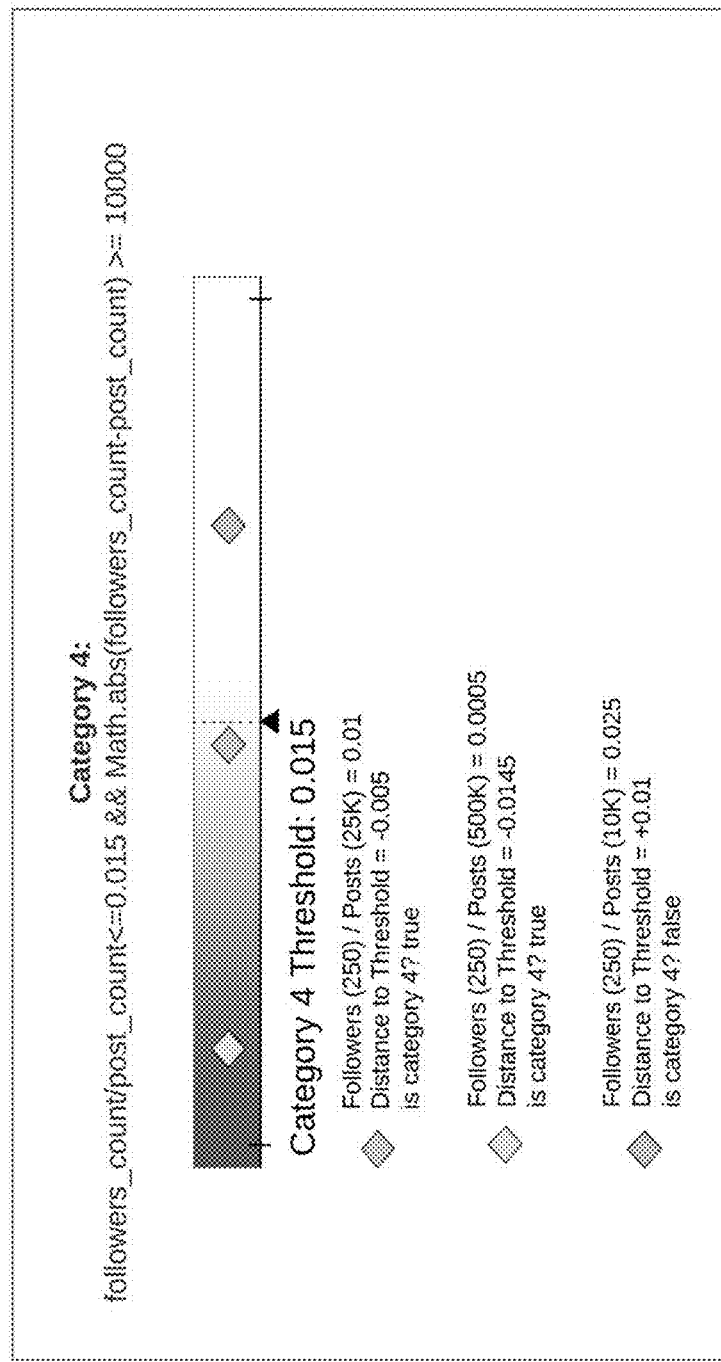

FIG. 4K relates to category 4 accounts, which are heavily automated. The ratio of followers to posts is at or below 0.015 in this non-limiting example. An additional hard cut-off which may be applied is that the absolute value of followers_count-post_count is 10,000 or more (at least 10K). That is, there preferably needs to be a very large imbalance between posts and followers.

Accounts represented by the blue and yellow diamonds fit both the cut-off criteria and have a ratio that is a negative distance from the threshold. The account represented by the green diamond has a score above the threshold, with a positive distance, and so does not meet the criteria. It also does not meet the absolute cut-off criteria.

Non-limiting Scoring Examples are now provided. These Examples include such information as the category determination from FIG. 3B and FIG. 4G, and the sub-scores described above.

00:33: Highly automated accounts, bot networks, high volume bot posters, iPhone bot factories, high-volume spammers Example User 1: Friends: 179, Followers: 55, Posts: 150K, Application: Twitter for iPhone Suspicious Base Score: Category 4 is true (high/spammy volume posting behaviors), distance from edge of category 4 threshold: −0.01463919994 (a larger margin but still salvageable in the case this was a frequently posting human, given that although the distance is negative—and hence fits within the category—it is a very small number, indicating that the account is right at the threshold).

Intent Sub-Score: 0.3 (possibly trying to blend in as a mid-level influencer)

Spamminess Sub-Score: 0 (already spammy by default for category 4. This one is not subtle which is what spamminess sub-score is trying to find)

Automation Sub-Score: 2.0 (Highly Automated). Despite posting from an iPhone in the sample case, behaviors for iPhone users do not fit the model of volumes in category 4 plus some Intent to appear influential.

Final Score: 0 (heavily automated account)

Example User 2: Friends: 196, Followers: 18, Posts: 40K, Application: IFTTT (if this then that, an automation service)

Suspicious Base Score: Category 3 is true (mid-level spammer/middle-aged account) distance from edge of category 3 threshold: −0.059524576741237685, Category 4 is true (high/spammy volume posting behaviors), distance from edge of category 4 threshold: −0.014524576741237685.

Intent Sub-Score: 0.1 (not trying to look influential)

Spamminess Sub-Score: 0.7 (Level 0: 0.4, Level 1: 0.3)—Seems subtle spammy or clever Automation Sub-Score: 0.75 (Light Automated). The combination of IFTTT and medium post volume yield a light-automation score.

Final Score: 28. Still on the spammy/automated side, but not a 0 which is heavily automated.

33:46: Automated relevant accounts (15 minute tech news), marketers, low/medium volume fake influencers, medium/targeted spam outlets Example User 1: Friends: 1100, Followers: 300, Posts: 40K, Application: Twitter for Android Suspicious Base Score: Category 4 is true, however barely over the line with distance from the threshold being: −0.006859752359936251, meaning that this account may be human. The other scores are preferably used to determine such accounts as being human or automated to some degree.

Intent Sub-Score: 0.1 (not trying to look influential)

Spamminess Sub-Score: 0.7 (Level 0: 0.4, Level 1: 0.3)—Seems subtle spammy or clever Automation Sub-Score: 0.7 (Light Automated). Despite using a legitimate application (Twitter for Android), this user model posts too high volume to a small audience.

Final Score: 40. May use some automation tools to augment post volumes.

Example User 2: Friends: 700, Followers: 800, Posts: 65K, Application: 15 Minute News Technology Suspicious Base Score: Category 4 is true, however barely above the threshold.
Intent Sub-Score: 0.1 (not trying to look influential)
Spamminess Sub-Score: 0
Automation Sub-score: 0 (not automated)
Final Score: 46. Despite being a 15 minute news site, this particular curated news feed has some interactive following and cleans their timeline. In contrast, a spammy automated outlet could post even as often every 15 minutes for a decade, without removing no longer relevant social media posts.

46-55: Middle of the road accounts that are not simple to categorize. These specific accounts are explored further with content-based machine learning tools, as behavior alone is not sufficient to make a precise determination of whether they are automated social media accounts.

65+: The higher the score, the greater the probability of the social media account belonging to an actual human being. In general, social media accounts at or above 65 are human operated.

Example User 1: Friends: 4K, Followers: 45K, Posts: 6K, Application: Twitter for Web Suspicious Base Score: none. Distance from any threshold is large (>5)
Intent Sub-score: 0.7. Based on followers|friends ratios this user seems somewhat influential
Spamminess Sub-score: 0
Automation Sub-score: 0
Final Score: 100. This is an influential (not verified user) magazine in their industry space.

Example User 2: Friends: 100, Followers: 180K, Posts: 190K, Application: Twitter Web Client Suspicious Base Score: none. Distance from any threshold is medium (>2.5)
Intent Sub-score: 1
Spamminess Sub-score: 0
Automation Sub-score: 0
Final Score: 100. This is an influential (verified) tech outlet.

Example 3: Friends: 4K, Followers: 4k, Posts: 6K, Application: IFTTT

Suspicious Base Score: none. Smaller distance from some categories (~1)
Intent Sub-score: 0.1
Spamminess Sub-score: 0
Automation Sub-score: 0
Final Score: 77. This is a human user with some interactive following who happens to use some automation tools (IFTTT) to share content. However due to the smaller post volume combined with an interactive following/friends means that this author is not fully automated. Had they have posted from an iPhone or other such personal device their score would likely be higher.

Non-limiting example of above analysis in operation during a live Twitter posting session FIGS. 5-10 give a non-limiting example of a bot net that was discovered on Twitter and that was found to be used to attack a particular company. In this case the company was AMD, a publicly traded company, and the attack may have been intended to temporarily reduce its stock price.

Throughout January and February, a botnet, which appears to originate from Japan, began aggressively pushing vulnerability stories related to other industry clients' vulnerabilities. The above described analysis was used to observe asymmetric attack patterns, featuring amplification, not origination. These interactive network of automated accounts (which may also be referred to as a "bot network") seem to operate by intentionally amplifying real exploit reports. Their strategy appears to be to trick real people into also retweeting the exploits and ultimately influencing HFT bots or algorithms, reporters or other influencers on the price of the stock. HFT bots/algorithms are High Frequency Trading automated stock automated accounts that trade based on factors in publicly available information, such as news, social media postings, and so forth.

On March 13th, the same botnet, began pushing vulnerability stories related to AMD, in addition to other software client vulnerabilities. On March 14th, a small cybersecurity firm called CTS Labs didn't follow industry norms or protocol for reporting a massive BIOS flaw in AMD Ryzen and EPYC processors. The firm didn't alert AMD or industry professionals and went straight to publication. Circumstances around who contacted them and their possible financial arbitrage from their vulnerability Edge suggest illegal or at least subtly coordinated activity.

Figure 5:
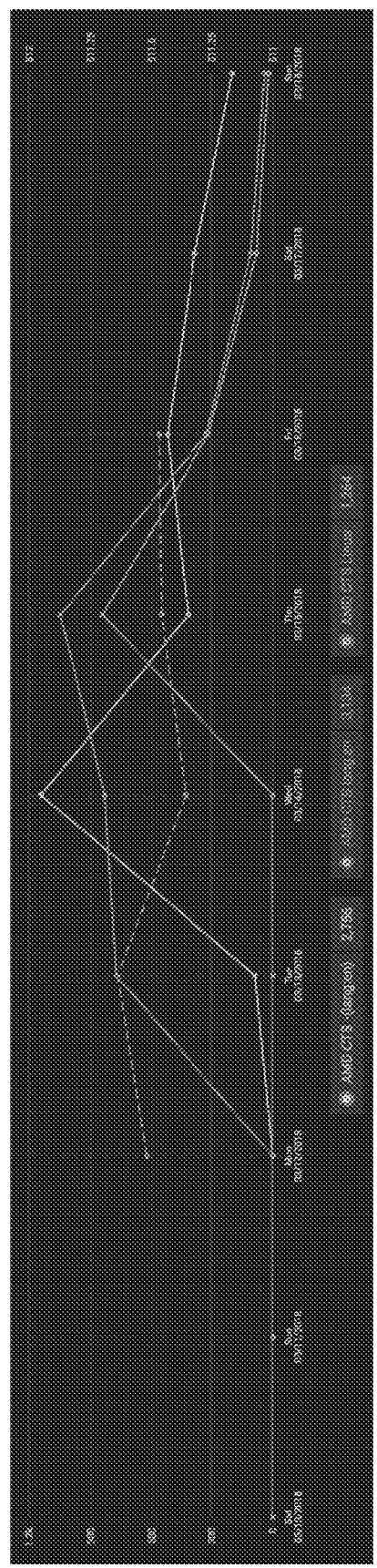
FIG. 5 shows the results of the AMD twitter attack as it occurred over time.

FIG. 5 shows the results of the AMD twitter attack as it occurred over time. Upon analyzing the initial spike of non-English language twitter traffic, a bot-network (mainly Japanese) was shown to be driving the conversation (orange line) with nodes that are highly interconnected.

Figure 6:
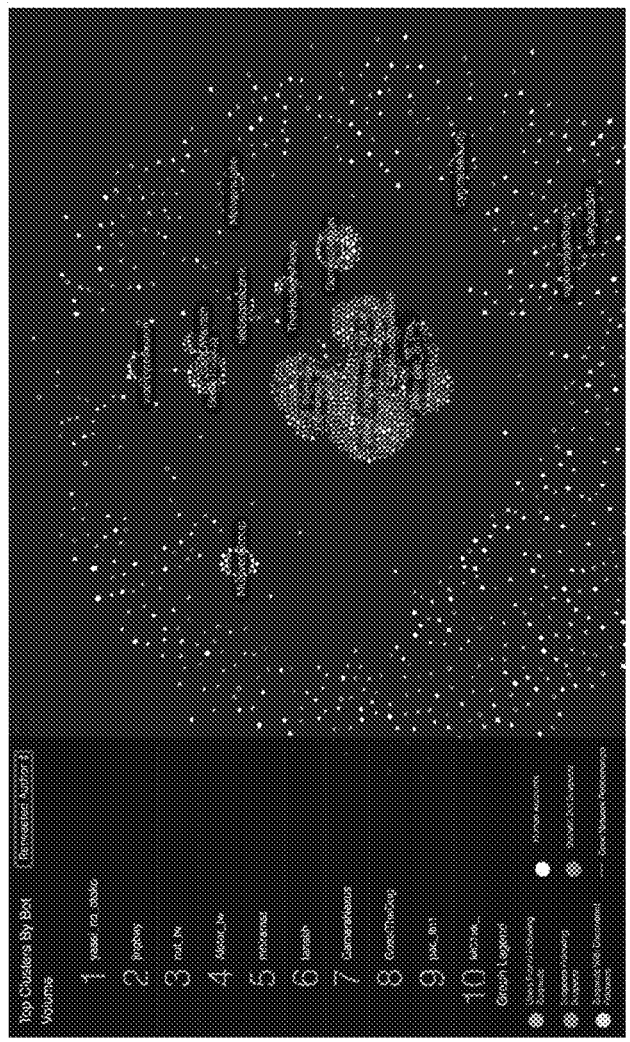
FIG. 6 shows the connections between various entities that are reporting (retweeting) these tweets about AMD, early in the attack.

FIG. 6 shows the connections between various entities that are reporting (retweeting) these tweets about AMD, early in the attack. Typically in these cases, automated accounts will drive up the volume of a conversation in an apparent attempt to drive down stock price.

Figure 7:
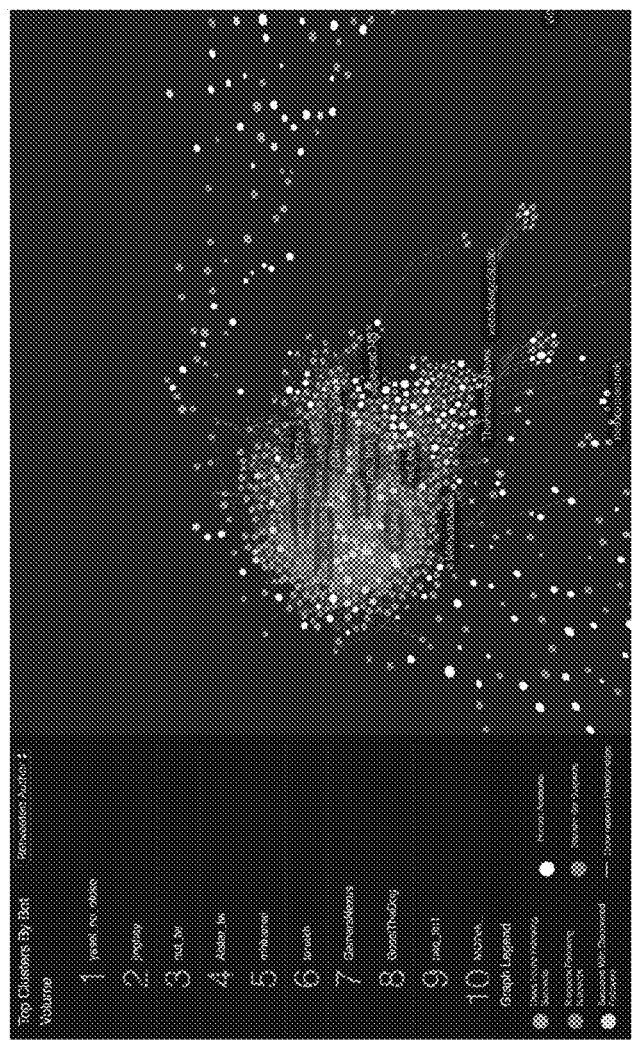
FIG. 7 shows a zoom into part of the network, which started to push a tweet from Linus Torvalds, stating that the apparently vulnerability was not relevant.

FIG. 7 shows a zoom into part of the network, which started to push a tweet from Linus Torvalds, stating that the apparently vulnerability was not relevant. Apparently the bot net was not able to determine whether a tweet was helpful or harmful to its mission, and so blindly retweeted anything related to AMD or the story of the vulnerability.

Figure 8:
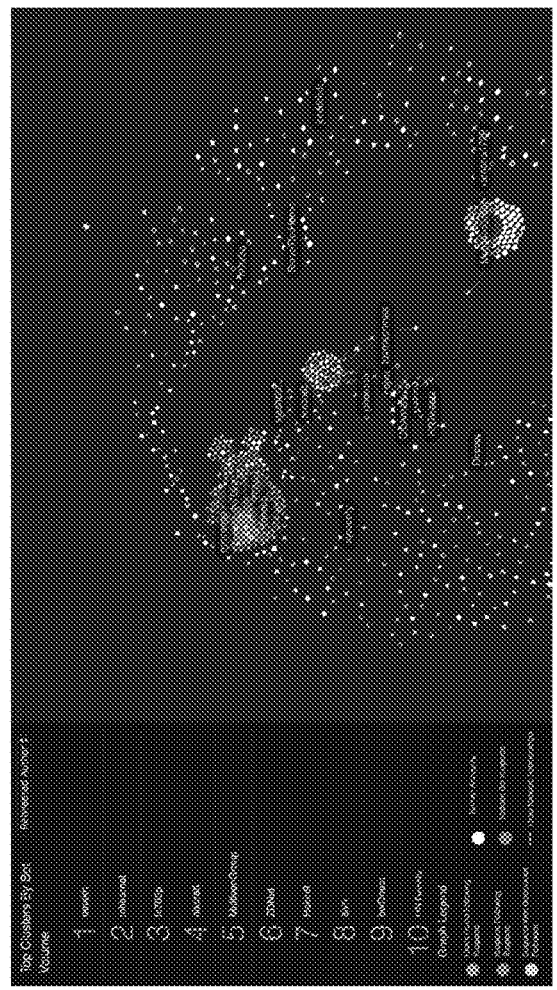
FIGS. 8-10 show other parts of the automated account (bot) network, with FIG. 9 being a zoom into one part of the network and FIG. 10 being a deep zoom into that part of the network.
Figure 9:
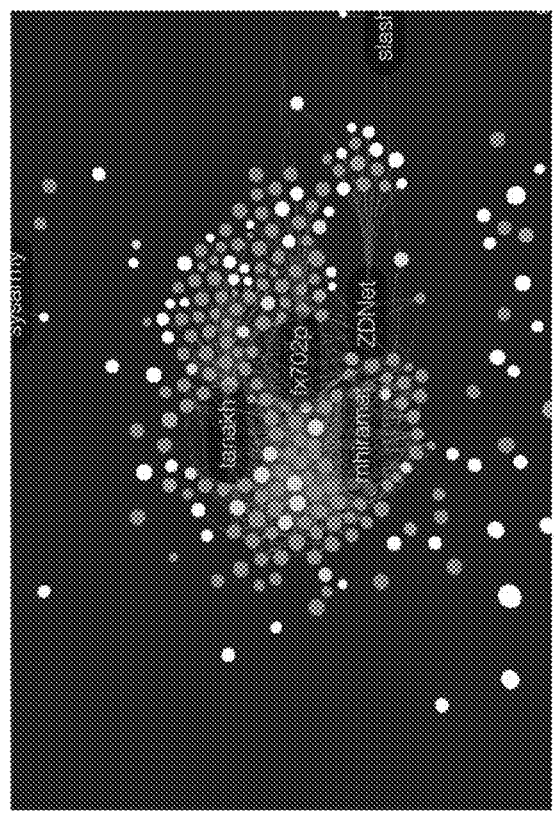
Figure 10:
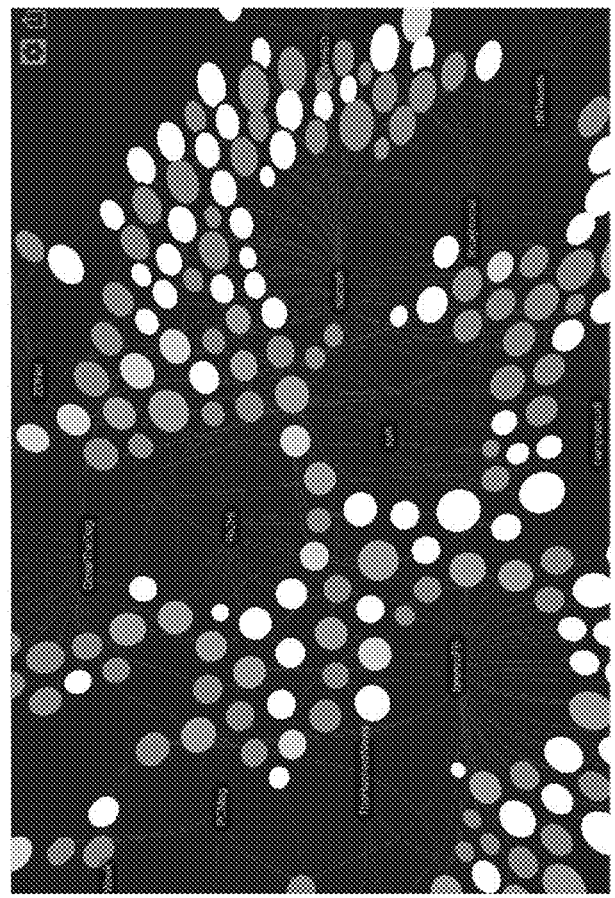

FIGS. 8-10 show other parts of the interactive network of automated accounts, with FIG. 9 being a zoom into one part of the network and FIG. 10 being a deep zoom into that part of the network.

FIG. 11 shows a non-limiting, illustrative example of an API (application programming interface) for obtaining the social medial channel information, as part of a detector API service for supporting the detection of automated accounts. The Detector API Service is provided a search query, data source, and date range. The data source is a social media channel and its attendant information as described above. The service will then query per that data source (i.e Twitter) and return the activities, activity clusters, and author/relationship index per that batch of activities.

The number of activities is typically limited to 2000-4000 for speed of analysis. In a high-volume amplification attack, suspicious authors who post at the same intervals may be located by slicing the volume into batches of 2000-4000 activities. With the focus of detection being on the bot-network scale versus an individual author classification scheme, a batch of 2000-4000 tweets has been found to be suitable to detect an interactive network of automated accounts. Optionally it may be determined that a poster is suspicious based on average twitter or other social media posting growth patterns over time.

The pool of suspicious authors (entities) may be reduced as described above or alternatively may include all authors in a particular batch. This pool of suspicious authors is used to query the Twitter Followers Graph API for each suspicious author correlated with the pool of 2000-4000 tweets will yield an interactive network of automated accounts. Knowing that the influence hierarchies are present both in amateur and professional interactive network of automated accounts, the network characteristics of the group of authors becomes the detection method.

Optionally the above bot network information is used to detect when an attack is starting, so that the attacked company, organization or individual can defend themselves. In small volume queries or early detection scenarios it is possible to use small volumes of 10-50 tweets plus historic suspect data (an automated accounts graph database) to understand if an attack is starting up.

Example 2—Other Botnets

Figure 12:
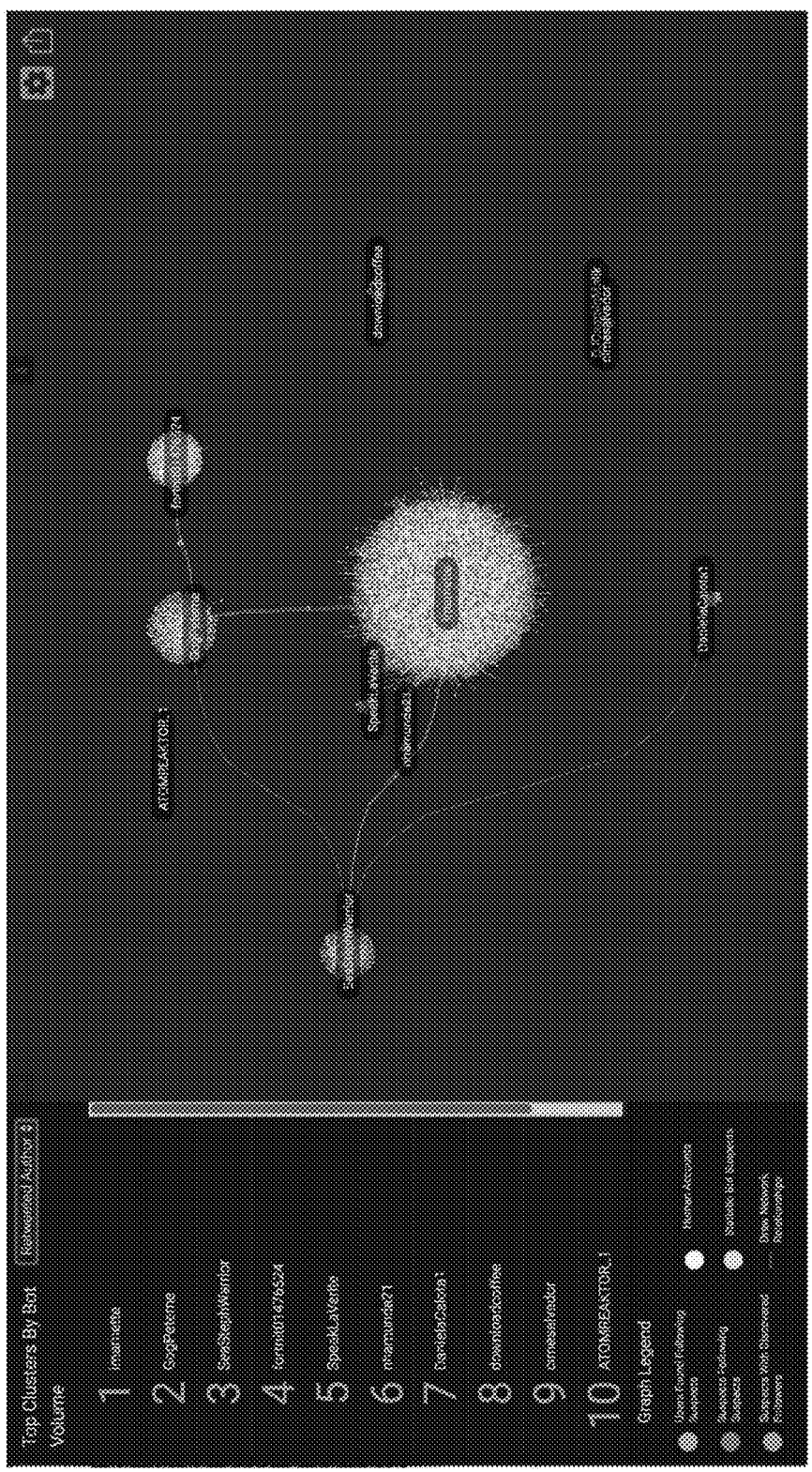
FIG. 12 shows a non-limiting example of botnet clusters and how they may be connected.

Other non-limiting illustrative botnets, or groups of automated accounts that act synchronously, have also been detected using the above methods. For example, FIG. 12 relates to a plurality of different botnet clusters and their connections. Some botnet clusters are connected, while others are not, as shown.

Figure 13:
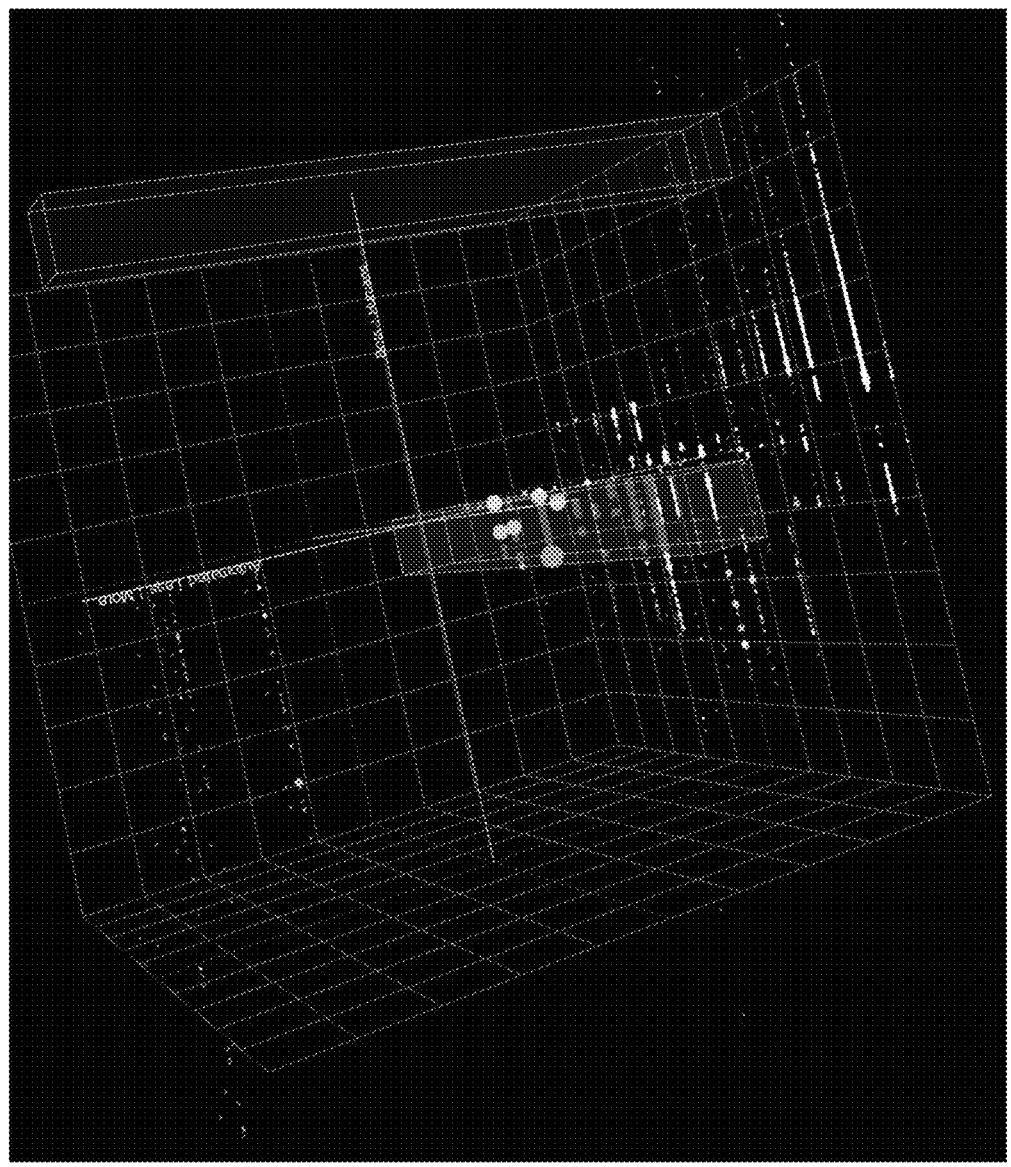
FIG. 13 shows that detected automated accounts, or bots, correlate with greater automation.

FIG. 13 shows that greater automation of accounts is associated with more botnet clusters.

Figure 14:
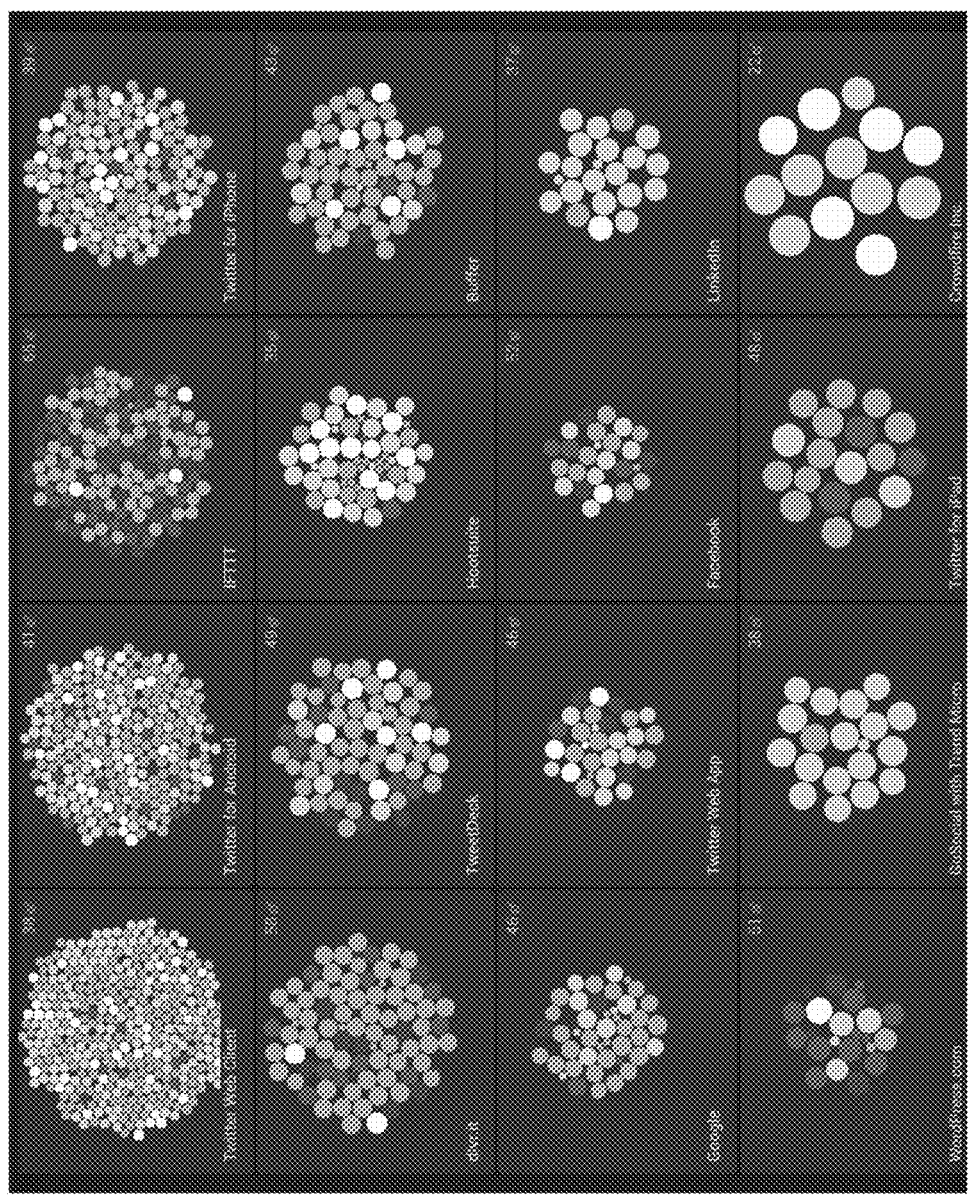
FIG. 14 shows that certain software applications for posting to social media are more likely to be associated with automated accounts than others.

FIG. 14 shows that certain software applications for posting to social media are more likely to be associated with automated accounts than others.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for detecting an interactive network of a plurality of automated accounts posting to a social media channel, wherein each automated account is operated by at least one social media account computational device, the system comprising: an ingestion computational device comprising a first memory for storing a plurality of first instructions and a first processor for executing said first instructions, wherein said first instructions include instructions for:
   connecting to the social media channel; and
   receiving a plurality of social media postings from a plurality of posting entities;
   the system further comprising an analysis computational device comprising a second memory for storing a plurality of second instructions and a second processor for executing said second instructions, wherein said second instructions include instructions for:
   determining whether at least one posting entity is a suspected bot; and
   determining a score for at least the following characteristics of each automated account:
      whether the number of followers is larger than the number of postings: post_count<foll_count; and
      the absolute value of the number of followers minus the number of postings: foll_count−post_count;
   and a computer network for communication between said computational devices;
   wherein said analysis computational device further comprises a first set of machine codes selected from the native instruction set for receiving a plurality of social media postings, a second set of machine codes selected from the native instruction set for applying a plurality of filters to said postings and entities authoring said postings, wherein each filter comprises at least one characteristic above, and a third set of machine codes selected from the native instruction set for determining a category of said automated social media account as human or automated;
   wherein said ingestion engine obtains social media messages for a plurality of social media accounts, said ingestion computational device transmitting said social media messages to said analysis computational device; and wherein said analysis computational device detects a network of a plurality of connected automated social media accounts acting in concert according to a statistical analysis of said social media messages; wherein at least one thousand social media messages, at least one thousand followers of each social media account or both are analyzed; and wherein behavior of said network of connected automated social media accounts acting in concert is monitored for social media mentions.

2. The system of claim 1, wherein said second instructions further comprise instructions to determine a score for at least one of the following characteristics of each automated account:
   a. Ratio of the number of followers to the number of postings: foll_count/post_count;
   b. Total number of postings: post_count
   c. Sum of the number of followers and the number of postings: foll_count+post_count
   d. Ratio of the number of followers to number of friends: foll_count/friends_count;
   e. Support application software used for posting.

3. The system of claim 1, wherein said third set of machine codes assigns a social media account to one of a plurality of categories, wherein at least one category is automated and at least one category is identified as human operated; wherein said categories are distinguished at least according to a cutoff point of too much activity for a particular volumetric growth phase of the account.

4. The system of claim 3, wherein said cutoff comprises a combination of total number of followers and posts, and a ratio of followers to posts.

5. The system of claim 4, wherein said third set of machine codes comprises codes for calculating a number of followers (accounts following said social media account) and a number of friends (accounts that said social media account is following); if said number of friends is greater than said number of followers, codes for determining a ratio of said followers to said friends; and codes for determining a higher automation score as said ratio increases.

6. The system of claim 4, wherein said third set of machine codes comprise codes for calculating a ratio of number of followers to number of posts; as said ratio decreases, said codes determine a higher automation score.

7. The system of claim 6, wherein said social media computational device comprises one or more of a laptop, a PC, a mobile communication device, a mobile telephone, a tablet computational device and a plurality of cloud based computational services.

8. The system of claim 7, wherein said social media computational device comprises a support social media application for posting social media messages to said social media channel in an automated manner, wherein said analysis computational device determines an automation behavior score for a social media account associated with said social media computational device at least partially according to a characterization of said support social media application.

9. The system of claim 8, wherein said analysis computational device further comprises a fourth set of machine codes selected from the native instruction set for adding scores obtained for said category, said automation behavior, and said automation scores, to form a final score; and for determining a likelihood of said social media account being operated automatically according to said final score.

10. The system of claim 9, wherein said analysis computational device comprises an operating system and wherein said operating system determines said native instruction set.

11. The system of claim 9, wherein said analysis computational device further comprises a fifth set of machine codes for detecting a plurality of connected automated social media accounts according to said final scores and according to social media connections between said automated social media accounts.

12. The system of claim 11, wherein said social media connections comprise resharing, liking, favoriting or otherwise promoting a social media message from a first automated social media account by a second automated social media account.

13. The system of claim 11, wherein said analysis computational device further comprises a sixth set of machine codes for displaying connections between said connected automated social media accounts in a graph, the system further comprising a display for displaying said graph to a user.

14. The system of claim 13, further comprising at least one recipient computational device for receiving an alarm about said connected automated social media accounts, said alarm comprising at least one of an identity of said connected automated social media accounts or a content distributed by said connected automated social media accounts.

15. The system of claim 14, wherein said alarm relates to said content distributed by said connected automated social media accounts, wherein said content relates to information about a publicly traded company.

16. The system of claim 15, wherein each set of machine codes is stored on a memory associated with said computational device.

* * * * *